(12) United States Patent
Sakai et al.

(10) Patent No.: US 8,705,333 B2
(45) Date of Patent: Apr. 22, 2014

(54) SUPER-RESOLUTION OPTICAL RECORDING MEDIUM ON WHICH INFORMATION IS RECORDED USING TRAIN OF PREPITS, OPTICAL RECORDING MEDIUM REPRODUCTION DEVICE, AND CONTROL METHOD

(71) Applicant: Sharp Kabushiki Kaisha, Osaka (JP)

(72) Inventors: Toshihiko Sakai, Osaka (JP); Hirohisa Yamada, Osaka (JP); Masaki Yamamoto, Osaka (JP); Yasuhiro Harada, Osaka (JP); Go Mori, Osaka (JP); Hideharu Tajima, Osaka (JP); Nobuyuki Takamori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/027,452

(22) Filed: Sep. 16, 2013

(65) Prior Publication Data

US 2014/0010057 A1   Jan. 9, 2014

Related U.S. Application Data

(63) Continuation of application No. 13/734,410, filed on Jan. 4, 2013, now Pat. No. 8,570,850, which is a continuation of application No. 13/425,060, filed on Mar. 20, 2012, now Pat. No. 8,379,505, which is a continuation of application No. 12/675,557, filed as application No. PCT/JP2008/065376 on Aug. 28, 2008, now Pat. No. 8,223,620.

(30) Foreign Application Priority Data

Aug. 30, 2007   (JP) ................................ 2007-224836

(51) Int. Cl.
   *G11B 7/24*   (2013.01)

(52) U.S. Cl.
   USPC ..................................... 369/275.4; 369/53.2

(58) Field of Classification Search
   None
   See application file for complete search history.

(56) References Cited

U.S. PATENT DOCUMENTS

| 4,940,618 A | 7/1990 | Hamada et al. |
| 4,990,388 A | 2/1991 | Hamada et al. |

(Continued)

FOREIGN PATENT DOCUMENTS

| JP | 02-132649 | 5/1990 |
| JP | 03-185628 | 8/1991 |

(Continued)

OTHER PUBLICATIONS

Tominaga J. et al., "An approach for recording and readout beyond the diffraction limit with an Sb thin film," Applied Physics Letter, vol. 73, No. 15, Oct. 12, 1998, pp. 2078-2080.

(Continued)

*Primary Examiner* — Paul Huber
(74) *Attorney, Agent, or Firm* — Edwards Wildman Palmer LLP; David G. Conlin; Steven M. Jensen

(57) ABSTRACT

A super-resolution optical recording medium includes: a medium information region on which medium identification information is recorded; a content region on which content information is recorded; and a blank region provided between the medium information region and the content region and in which at least two tracks are provided so as to connect a train of prepits in the medium information region and a train of prepits in the content region. No information is recorded on the blank region. Thus a super-resolution optical recording medium is provided in which a region on which medium identification information is recorded and a region on which content information is recorded are different in track pitch and in which a reproduction error hardly occurs when reproduction shifts from the region on which the medium identification information is recorded to the region on which the content information is recorded.

4 Claims, 11 Drawing Sheets

(56) References Cited

U.S. PATENT DOCUMENTS

| | | | |
|---|---|---|---|
| 5,109,373 | A | 4/1992 | Ohno et al. |
| 5,150,351 | A | 9/1992 | Ohno et al. |
| 5,155,723 | A | 10/1992 | Hamada et al. |
| 5,448,552 | A | 9/1995 | Onagi |
| 5,659,537 | A | 8/1997 | Hirokane et al. |
| 5,886,973 | A | 3/1999 | Iida |
| 6,143,468 | A | 11/2000 | Ohno et al. |
| 6,294,310 | B1 | 9/2001 | Ohno et al. |
| 6,449,231 | B1 | 9/2002 | Numata |
| 6,687,194 | B1 | 2/2004 | Kobayashi et al. |
| 6,965,556 | B1 | 11/2005 | Kikukawa et al. |
| 7,245,576 | B2 | 7/2007 | Ichihara et al. |
| 7,474,599 | B2 | 1/2009 | Yamanaka |
| 7,499,389 | B2 | 3/2009 | Kim et al. |
| 8,233,375 | B2 | 7/2012 | Tajima et al. |
| 8,355,304 | B2 | 1/2013 | Tajima et al. |
| 8,400,903 | B2 | 3/2013 | Tajima et al. |
| 8,446,807 | B2 | 5/2013 | Tajima et al. |
| 8,462,606 | B2 | 6/2013 | Tajima et al. |
| 2001/0049074 | A1 | 12/2001 | Ohno et al. |
| 2002/0027869 | A1 | 3/2002 | Morita et al. |
| 2003/0002429 | A1 | 1/2003 | Morita |
| 2004/0095877 | A1 | 5/2004 | Osakabe |
| 2004/0184396 | A1 | 9/2004 | Lee et al. |
| 2004/0190432 | A1 | 9/2004 | Ichihara et al. |
| 2005/0117478 | A1 | 6/2005 | Kuwahara et al. |
| 2005/0128931 | A1 | 6/2005 | Kim et al. |
| 2005/0141377 | A1 | 6/2005 | Yamanaka |
| 2005/0157631 | A1 | 7/2005 | Lee et al. |
| 2005/0163026 | A1 | 7/2005 | Oshima et al. |
| 2005/0237912 | A1 | 10/2005 | Kikukawa et al. |
| 2005/0270959 | A1 | 12/2005 | Iwasa et al. |
| 2006/0098559 | A1 | 5/2006 | Hino et al. |
| 2006/0280895 | A1 | 12/2006 | Kikukawa et al. |
| 2006/0280896 | A1 | 12/2006 | Kikukawa et al. |
| 2007/0030795 | A1 | 2/2007 | Kikuawa et al. |
| 2007/0116917 | A1 | 5/2007 | Kim et al. |
| 2010/0027397 | A1 | 2/2010 | Vlutters et al. |
| 2010/0061218 | A1 | 3/2010 | Miura |
| 2010/0220567 | A1 | 9/2010 | Tajima et al. |

FOREIGN PATENT DOCUMENTS

| | | |
|---|---|---|
| JP | 05-067348 | 3/1993 |
| JP | 05-101540 | 4/1993 |
| JP | 05-151571 | 6/1993 |
| JP | 06-060421 | 3/1994 |
| JP | 06-176367 | 6/1994 |
| JP | 07-014167 | 1/1995 |
| JP | 07-073506 | 3/1995 |
| JP | 07-105539 | 4/1995 |
| JP | 2000-173124 | 4/1995 |
| JP | 07-220284 | 8/1995 |
| JP | 08-007275 | 1/1996 |
| JP | 09-071049 | 3/1997 |
| JP | 09-320094 | 12/1997 |
| JP | 10-112063 | 4/1998 |
| JP | 11-240250 | 9/1999 |
| JP | 2000-123422 | 4/2000 |
| JP | 2001-035012 | 2/2001 |
| JP | 2001-067676 | 3/2001 |
| JP | 2001-250274 | 9/2001 |
| JP | 2002-260241 | 9/2002 |
| JP | 2003-016697 A | 1/2003 |
| JP | 2003-016997 | 1/2003 |
| JP | 2003-030849 | 1/2003 |
| JP | 2003-077193 | 3/2003 |
| JP | 2003-323723 | 11/2003 |
| JP | 2004-112100 | 4/2004 |
| JP | 2004-234719 | 8/2004 |
| JP | 2005-044421 | 2/2005 |
| JP | 2005-078680 | 3/2005 |
| JP | 2005-078782 | 3/2005 |
| JP | 2005-093063 | 4/2005 |
| JP | 2005-135538 | 5/2005 |
| JP | 2005-209322 | 8/2005 |
| JP | 2006-085863 | 3/2006 |
| JP | 2006-176367 | 7/2006 |
| JP | 2006-520990 | 9/2006 |
| JP | 2006-344256 | 12/2006 |
| JP | 2007-073506 | 3/2007 |
| JP | 2007-100139 | 4/2007 |
| JP | 2007-519143 | 7/2007 |
| JP | 2007-220284 | 8/2007 |
| WO | 02/19322 | 3/2002 |
| WO | 02/058060 | 7/2002 |
| WO | 2004/029943 | 4/2004 |
| WO | 2004/084200 | 9/2004 |
| WO | 2005/064601 | 7/2005 |
| WO | 2007/100139 | 4/2007 |

OTHER PUBLICATIONS

Office Action for corresponding U.S. Appl. No. 12/224,706 dated Oct. 4, 2010.
Office Action for corresponding U.S. Appl. No. 12/814,314 dated Dec. 9, 2010.
Office Action for corresponding U.S. Appl. No. 12/814,331, dated Dec. 21, 2010.
Office Action for corresponding U.S. Appl. No. 12/814,362 dated Feb. 18, 2011.
Office Action for corresponding U.S. Appl. No. 12/814,354 dated Feb. 4, 2011.
Office Action for corresponding U.S. Appl. No. 12/814,342 dated Jan. 11, 2011.
Office Action for corresponding U.S. Appl. No. 12/224,706 dated May 17, 2011.
Office Action for U.S. Appl. No. 12/814,354 dated Jun. 22, 2011.
Office Action for U.S. Appl. No. 12/814,331 dated Jun. 8, 2011.
Office Action for U.S. Appl. No. 12/814,314 dated Jun. 8, 2011.
Office Action for U.S. Appl. No. 12/814,342 dated Jul. 11, 2011.
Office Action for U.S. Appl. No. 12/814,362 dated Jul. 20, 2011.
Office Action for U.S. Appl. No. 12/814,331 dated Nov. 7, 2011.
Office Action for U.S. Appl. No. 12/224,706 dated Nov. 8, 2011.
Office Action for U.S. Appl. No. 12/224,706 dated Jan. 26, 2012.
Office Action for U.S. Appl. No. 12/814,362 dated Dec. 29, 2012.
Office Action for U.S. Appl. No. 12/814,342 dated Dec. 29, 2012.
Office Action for U.S. Appl. No. 12/814,331 dated Jan. 26, 2012.
Advisory Action for U.S. Appl. No. 12/814,354 dated Feb. 6, 2012.
Advisory Action for U.S. Appl. No. 12/814,314 dated Jan. 31, 2012.
Office Action for U.S. Appl. No. 12/814,354 dated Nov. 21, 2011.
Office Action for U.S. Appl. No. 12/814,314 dated Nov. 17, 2011.
U.S. Appl. No. 12/224,706, filed Sep. 2, 2008.
Office Action for U.S. Appl. No. 12/814,314 dated Mar. 13, 2012.
Office Action for U.S. Appl No. 12/814,331 dated Sep. 26, 2012.
Office Action for U.S. Appl. No. 12/814,362 dated Nov. 6, 2012.
Office Action for U.S. Appl. No. 12/675,557 dated Apr. 8, 2011.
Office Action for U.S. Appl. No. 12/814,342 dated Nov. 2, 2012.
Office Action for U.S. Appl. No. 12/224,706 dated Jan. 30, 2013.
Office Action for U.S. Appl. No. 12/224,706 dated Jul. 26, 2013.
Office Action for U.S. Appl. No. 12/224,706 dated Nov. 15, 2013.
International Search Report for International Application No. PCT/JP2008/065376 dated Nov. 4, 2008.
International Search Report for International Application PCT/JP2007/052449 dated May 22, 2007.
Notice of Allowance issued in U.S. Appl. No. 13/734,410 dated Jun. 27, 2013.
Office Action for U.S. Appl. No. 12/814,362 dated Dec. 29, 2011.
Office Action for U.S. Appl. No. 12/814,342 dated Dec. 29, 2011.

F I G. 8
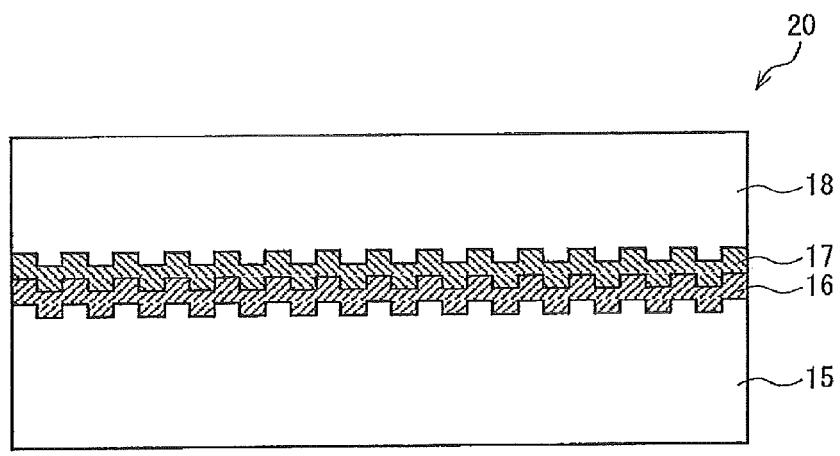

SUPER-RESOLUTION OPTICAL RECORDING MEDIUM ON WHICH INFORMATION IS RECORDED USING TRAIN OF PREPITS, OPTICAL RECORDING MEDIUM REPRODUCTION DEVICE, AND CONTROL METHOD

CROSS-REFERENCE TO RELATED APPLICATION(S)

This application is a continuation of application U.S. Ser. No. 13/734,410 filed on Jan. 4, 2013, which is a continuation of U.S. Ser. No. 13/425,060 filed on Mar. 20, 2012, now U.S. Pat. No. 8,379,505, which is a continuation of U.S. Ser. No. 12/675,557 filed on Feb. 26, 2010, now U.S. Pat. No. 8,223,620, which is a National Phase filed under 35 USC 371 of international application PCT/JP2008/065376 filed on Aug. 28, 2008, which claims priority to Japanese Application No. 2007-224836 filed on Aug. 30, 2007.

TECHNICAL FIELD

The present invention relates to a super-resolution optical recording medium on which information is recorded with the use of a train of prepits including prepits shorter than a resolution limit of an optical system of a reproduction device or a train of recording marks including recording marks shorter than the resolution limit of the optical system of the reproduction device, the information being reproduced with the use of a super-resolution technique. The present invention especially relates to (i) a super-resolution optical recording medium (a) which can be reproduced by a reproduction device which is also capable of reproducing a normal optical recording medium on which information is recorded with the use of a train of prepits which is constituted by prepits longer than the resolution limit of the optical system of the reproduction device and (b) in which a region where content information is recorded has a small track pitch so that high recording density can be realized, and (ii) a reproduction device which is capable of reproducing both of the super-resolution optical recording medium and the normal optical recording medium.

BACKGROUND ART

In recent years, there have been more opportunities to handle information having large data amount such as an image. On this account, it is necessary to increase recording density of an optical recording medium. In view of this, the following optical recording medium and super-resolution technique are proposed: (i) an optical recording medium on which information is recorded with the use of prepits constituted by concavity and/or convexity shorter than a resolution limit of an optical system of a reproduction device and (ii) a super-resolution technique for reproducing the optical recording medium. Note that an optical recording medium reproduced with the use of the super-resolution technique is hereinafter referred to as "super-resolution medium" or "super-resolution optical recording medium", and a conventional optical recording medium, i.e., an optical recording medium which does not require use of the super-resolution technique and on which information is recorded with the use of prepits longer than the resolution limit of the optical system of the reproduction device is hereinafter referred to as "normal medium" or "normal optical recording medium". Further, note that the resolution limit of the optical system is determined based on (i) a wavelength of a laser beam with which the reproduction device irradiates a medium and (ii) a numerical aperture of the optical system.

Examples of such a super-resolution medium include optical recording media disclosed in Patent Literatures 1 and 2, respectively.

According to the super-resolution medium disclosed in Patent Literature 1, a thermochromic layer whose optical properties such as transmissivity varies depending on temperature is provided on a surface of a reflecting layer on which surface laser beam is incident. In a case where the thermochromic layer is irradiated with a laser beam having certain power, a super-resolution effect that a spot of the laser beam goes into a pseudo-reduction state is produced. Thus, the thermochromic layer functions as a mask layer. Temperature distribution is caused in the spot on the mask layer due to light intensity distribution, and transmissivity distribution is caused due to the temperature distribution. For example, in a case where the mask layer is made of a material whose transmissivity becomes higher as the temperature rises, only parts of the mask layer which have high temperature are high in transmissivity. Thus, the spot formed on the surface of the reflecting layer is brought into the pseudo-reduction state. This allows reproduction of a prepit shorter than a resolution limit of an optical system. The technique disclosed in Patent Literature 1 can be applied not only to a rewritable optical recording medium but also to a read-only optical recording medium.

Further, according to the super-resolution medium disclosed in Patent Literature 2, a film layer (referred to as "function layer") made of a thin metal film or the like is provided on a substrate on which information is recorded with the use of prepits which are concavities and/or convexities. At present, it is unknown how a super-resolution technique used for the super-resolution medium of Patent Literature 2 works. However, it is possible to reproduce a prepit shorter than the resolution limit of the optical system in a case where the temperature of the function layer is changed by irradiating the function layer with a laser beam having higher power than usual.

CITATION LIST

Patent Literature 1

Japanese Patent Application Publication, Tokukai, No. 2001-35012 A (Publication Date: Feb. 9, 2001)

Patent Literature 2

Japanese Patent Application Publication, Tokukai, No. 2001-250274 A (Publication Date: Sep. 14, 2001)

SUMMARY OF INVENTION

As described above, a super-resolution medium is irradiated by a laser beam having high power. Such power of the laser beam is higher than that of a laser beam with which a normal medium is irradiated.

Therefore, a super-resolution medium cannot be reproduced with the use of a reproduction device which is designed to reproduce a normal medium since such a reproduction device emits a laser beam having low power. As a result, such a super-resolution medium is rejected as an irreproducible medium. Meanwhile, in a case where a normal medium is mistakenly loaded into a reproduction device which is designed to reproduce a super-resolution medium, such a normal medium may be broken due to heat since such a reproduction device emits a laser beam having high power. Alternatively, such a normal medium is rejected as an irreproducible medium since the super-resolution medium and the normal medium are different not only in laser beam power but also in linear velocity and clock.

In view of this, the inventors of the present invention devised a super-resolution medium 105 (see FIGS. 13 and 14) in order to realize a compatible reproduction device which is capable of reproducing both of a normal medium and a super-resolution medium. The super-resolution medium 105 includes a region 101 on which medium identification information indicating that the super-resolution medium 105 is a super-resolution medium is recorded with the use of trains of prepits which are similar to those of a normal medium and which are away from one another by a track pitch that is similar to that in the normal medium, i.e., recorded with the use of trains of prepits which are spirally provided and each of which is constituted by prepits longer than a resolution limit of an optical system of a reproduction device. That is, the medium identification information can be reproduced with the use of a laser beam having power suitable for a normal medium. Further, the super-resolution medium 105 includes a region 102 on which content information is recorded with the use of trains of prepits which are away from one another by a track pitch smaller than that in the region 101, which are spirally provided, and each of which includes prepits shorter than the resolution limit of the optical system of the reproduction device.

As described above, according to the super-resolution medium 105, the medium identification information can be reproduced with the use of a laser beam having power suitable for a normal medium. This allows realization of a compatible reproduction device which is capable of reproducing both of a normal medium and a super-resolution medium. Specifically, such a reproduction device irradiates a medium, which is loaded into the reproduction device, with a laser beam having power suitable for a normal medium so as to read the medium identification information, and then determines, based on the medium identification information, whether the medium thus loaded is a normal medium or a super-resolution medium. In a case where it is determined that the medium thus loaded is a normal medium, reproduction of content information starts, whereas in a case where it is determined that the medium thus loaded is the super-resolution medium 105, the reproduction device switches to a light beam having power suitable for the super-resolution medium 105 before reproduction of content information starts.

However, unfortunately, a reproduction error tends to occur when reproduction shifts from the region 101 to the region 102. This is because trains of prepits in the region 101 are provided so as to be continuous with trains of prepits in the region 102, which is different from the region 101 in track pitch, in order that the optical system of the reproduction device can move from the region 101 to the region 102 while consecutively carrying out tracking servo control. The following description deals with this problem with reference to FIG. 14. FIG. 14 is an enlarged view of the interface between the region 101 and the region 102.

Since the trains of prepits in the region 101 are provided so as to be continuous with the trains of prepits in the region 102 as described above, a train of prepits a, which is adjacent to a train of prepits (train of prepits b) in the region 102, is provided in the region 101 so as to go around once. A track pitch between the train of prepits a and the adjacent train of prepits in the region 102 is reduced from a track pitch of the region 101 to a track pitch of the region 102 while the train of prepits a goes around once. That is, a track pitch between the train of prepits a and the train of prepits b is different from (i) a track pitch between the train of prepits a and an adjacent train of prepits in the region 101 and (ii) a track pitch between the train of prepits b and an adjacent train of prepits in the region 102.

As in the region 101, the train of prepits b, which is adjacent to the train of prepits (the train of prepits a) in the region 101, is provided in the region 102 so as to go around once. A track pitch between the train of prepits b and the adjacent train of prepits in the region 101 becomes larger from a track pitch of the region 102 to a track pitch of the region 101 while the train of prepits b goes around almost once. That is, as in the case of the train of prepits a, a track pitch between the train of prepits a and the train of prepits b is different from (i) a track pitch between the train of prepits a and an adjacent train of prepits in the region 101 and (ii) a track pitch between the train of prepits b and an adjacent train of prepits in the region 102.

Consequently, reproduction of the train of prepits a is likely to be affected by noise caused by the train of prepits b. Further, the tracking servo control is likely to become unstable when the reproduction device reads out the medium identification information recorded on the region 101, switches to laser beam power suitable for a super-resolution medium, and then starts reproduction of the content information recorded on the region 102. This is because (i) a track pitch between the train of prepits a and the train of prepits b changes while the train of prepits a goes around once, and (ii) a track pitch between the train of prepits a and the train of prepits b is different from (a) a track pitch between the train of prepits a and an adjacent train of prepits in the region 101 and (b) a track pitch between the train of prepits b and an adjacent train of prepits in the region 102. Such unstable tracking servo control causes a reduction in margin for external disturbances such as a tilt of the medium in a circumferential direction (tangential tilt), a tilt in a radial direction (radial tilt), and small fluctuation in laser beam power, thereby making the reproduction more likely to be affected by such external disturbances. Such external disturbances tend to cause a reproduction error.

The present invention was attained in view of the above problems, and an object of the present invention is to realize (i) a super-resolution optical recording medium in which a region on which medium identification information is recorded and a region on which content information is recorded are different in track pitch and in which a reproduction error hardly occurs when reproduction shifts from the region on which the medium identification information is recorded to the region on which the content information is recorded, (ii) an optical recording medium reproduction device which is capable of reproducing both of the super-resolution optical recording medium and a normal optical recording medium, (iii) a control method of the optical recording medium reproduction device, (iv) a control program for the optical recording medium reproduction device, and (v) a computer-readable recording medium for storing the program.

In order to attain the above object, a super-resolution optical recording medium of the present invention includes: a first region on which medium identification information which causes a medium type to be identified is recorded with use of trains of prepits each of which is constituted by prepits longer than a resolution limit of an optical system of an optical recording medium reproduction device; a second region on which content information is recorded with use of trains of prepits each of which includes a prepit equal to or shorter than the resolution limit of the optical system, the second region having a track pitch smaller than that of the first region; and a blank region provided between the first region and the second region so as to spirally connect the trains of prepits in the first region and the trains of prepits in the second region, the blank region including at least two tracks, a track pitch, between (i) a first one of said at least two tracks that is adjacent to a first one of the trains of prepits of the first region and (ii) the first one of the trains of prepits, being identical to a track pitch of the first region, a track pitch, between (i) a second one of said at least two tracks that is adjacent to a second one of the trains of prepits of the second region and (ii) the first one of the trains of prepits which is on the first region side, changing into a track pitch of the second region, and a track pitch, between (i) the second one of said at least two tracks and (ii) the second one of the trains of prepits being identical to the track pitch of the second region, and no information being recorded on the blank region.

Note that, for convenience of description, the following description deals with a case where two tracks are provided in the blank region. Note also that, of the two tracks, a track adjacent to a train of prepits in the first region is referred to as "a track A", and a track adjacent to a track of prepits in the second region is referred to as "a track B".

According to the arrangement, the medium identification information recorded on the first region is recorded with the use of a train of prepits which is constituted by prepits longer than the resolution limit of the optical system of the optical recording medium reproduction device, i.e., the medium identification information recorded on the first region is recorded in a similar manner to a normal optical recording medium. This allows the medium identification information to be reproduced with the use of a laser beam having power for a normal optical recording medium. Therefore, the optical recording medium reproduction device (i) irradiates a medium loaded into the optical recording medium reproduction device with a laser beam having power suitable for a normal optical recording medium so as to read out the medium identification information, and then (ii) determines, based on the medium identification information, whether the medium thus loaded is a normal optical recording medium or a super-resolution optical recording medium. Based on a result thus determined, the optical recording medium reproduction device can carry out processing in accordance with the medium thus loaded (can change, for example, the power of a laser beam in accordance with the medium thus loaded). This allows realization of a compatible reproduction device that is capable of reproducing both of a normal optical recording medium and the super-resolution optical recording medium.

According to the super-resolution optical recording medium, the content information is recorded with the use of a train of prepits including a prepit equal to or shorter than the resolution limit of the optical system. Further, the track pitch of the second region on which the content information is recorded is smaller than that of the first region. This allows realization of a super-resolution optical recording medium which has a storage capacity larger than a normal optical recording medium.

The super-resolution optical recording medium includes the blank region in which the tracks A and B are provided so as to connect the train of prepits in the first region and the train of prepits in the second region. Since the tracks A and B in the blank region is provided so as to be continuous with the train of prepits in the first region and the train of prepits in the second region, the optical system can smoothly move from the first region to the second region while consecutively carrying out tracking servo control.

The track A is provided so as to be away, by a track pitch same as that of the first region, from an adjacent train of prepits in the first region. This makes the reproduction of the first region less likely to be affected by noise caused by the track A, thereby making it possible to properly carry out tracking servo control.

A track pitch between the track B and the adjacent track A changes into the track pitch of the second region. A track pitch between the track B and the adjacent train of prepits in the second region is same as that of the second region. Although the tracking servo control becomes unstable during reproduction of the blank region, no reproduction error occurs since no information is recorded on the blank region. During reproduction of the track B, the tracking servo control can be stably carried out with respect to the track pitch of the second region. Thus, reproduction of the second region starts. Further, the reproduction of the second region is less likely to be affected by poise caused by the track B, and the tracking servo control can be carried out properly.

As such, it is possible to realize a super-resolution optical recording medium in which a region on which medium identification information is recorded and a region on which content information is recorded are different in track pitch and in which a reproduction error hardly occurs when reproduction shifts from the region on which the medium identification information is recorded to the region on which the content information is recorded.

Each of the tracks in the blank region may be (i) a train of prepits, (ii) a guide groove, or (iii) a combination of a train of prepits and a guide groove.

The super-resolution optical recording medium of the present invention is preferably arranged such that first address information indicative of a start position of the blank region is recorded on the first region, and second address information indicative of an end position of the blank region is recorded on the second region.

The super-resolution optical recording medium of the present invention is preferably arranged such that address information of the blank region is recorded on the first region.

According to the arrangement, the optical recording medium reproduction device (i) can recognize the position of the blank region so as to carry out proper processing (e.g. switch laser beam power of the optical recording medium reproduction device) with respect to the blank region, and the second region, and (ii) can cause the optical system to consecutively jump to an adjacent track in the blank region so as to smoothly shift to reproduction of the second region in a relatively short time period.

The super-resolution optical recording medium of the present invention is preferably arranged such that address information of the second region is recorded on the first region.

According to the arrangement, the optical recording medium reproduction device (i) can recognize the position of the blank region and the position of the second region so as to carry out proper processing (e.g. change laser beam power of the optical recording medium reproduction device) with respect to the blank region and the second region, and (ii) can cause the optical system to consecutively jump to an adjacent track in the blank region so as to speedily access a starting position or a desired position of the second region and smoothly shift to reproduction of the second region in a relatively short time period.

The super-resolution optical recording medium of the present invention is preferably arranged such that power Information indicative of power of a laser beam, with which the optical recording medium reproduction device irradiates the second region is recorded on the first region.

The super-resolution optical recording medium of the present invention is preferably arranged such that the first region includes a test read region where a train of prepits is provided, power of a laser beam with which the optical recording medium reproduction device irradiates the second region being adjusted with use of the train of prepits in the test read region, and the train of prepits of the test read region is formed by a modulation method so as to have a linear recording density, the modulation method and the linear recording density being identical to those of the trains of prepits in the second region.

According to the arrangement, the optical recording medium reproduction device can recognize laser beam power suitable for reproduction of the second region. This is because (i) power information indicative of power of a laser beam with which the second region is irradiated is recorded on the super-resolution optical recording medium contains or (ii) the super-resolution optical recording medium includes a test read region in which a train of prepits is provided for adjusting power of the laser beam with which the second region is irradiated. As such, it is possible to produce a further effect that the content information recorded on the second region can be properly reproduced.

Further, since the test read region is provided in the first region, it is possible to produce an effect that a storage capacity of the second region is not sacrificed.

The super-resolution optical recording medium of the present invention is preferably arranged such that blank power information indicative of power of a laser beam with which the optical recording medium reproduction device irradiates the blank region is recorded on the first region.

According to the arrangement, in which blank power information indicative of power of a laser beam with which the blank region is irradiated is recorded on the super-resolution optical recording medium, the optical recording medium reproduction device can recognize laser beam power suitable for the blank region. This produces a further effect that it is possible to properly carry out processing in the blank region. Note that the laser beam power suitable for the blank region may be, smaller than that suitable for reproduction of the second region. In such a case, it is possible to reduce power consumption of the optical recording medium reproduction device. This is because the optical recording medium reproduction device can accurately recognize the laser beam power suitable for the blank region based on the blank power information.

In order to attain the above object, an optical recording medium reproduction device of the present invention which is capable of reproducing (i) a super-resolution optical recording medium and (ii) a normal optical recording medium on which various information is recorded with use of trains of prepits each of which is constituted by prepits longer than a resolution limit of an optical system of the optical recording medium reproduction device, the optical recording medium reproduction device, includes: a reproducing section which reproduces information recorded on the super-resolution optical recording medium or the normal optical recording medium, by (i) irradiating a desired position of the super-resolution optical recording medium or the normal optical recording medium with reproduction light, and then (ii) converting, into an electric signal, light reflected from the super-resolution optical recording medium or the normal optical recording medium; a servo control section which carries out servo control in response to the electric signal; a content information reproducing section which reproduces content information recorded on the super-resolution optical recording medium or the normal optical recording medium in response to the electric signal; and a control section which controls operations of the optical recording medium reproduction device, the control section, including: an information acquisition section which (i) reproduces and acquires medium identification information in response to an electric signal obtained when the reproduction light is suitable for reproducing the normal optical recording medium with use of reproduction light having power suitable for reproduction of the normal optical recording medium, and (ii) acquires blank region information indicative of presence of a blank region; a medium identification section which determines, based on the medium identification information, whether or not a super-resolution optical recording medium is loaded; and a blank control section which controls the content information reproducing section based on the blank region information so that the content information reproducing section stops an operation in the blank region.

In order to attain the above object, a method of the present invention for controlling an optical recording medium reproduction device which is capable of reproducing (i) a super-resolution optical recording medium and (ii) a normal optical recording medium on which various information is recorded with use of trains of prepits each of which is constituted by prepits longer than a resolution limit of an optical system of the optical recording medium reproduction device, the method comprising the steps of: reproducing information recorded on the super-resolution optical recording medium or the normal optical recording medium, by (i) irradiating a desired position of the super-resolution optical recording medium or the normal optical recording medium with reproduction light, and then (ii) converting into an electric signal light reflected from the super-resolution optical recording medium or the normal optical recording medium; carrying out servo control in response to the electric signal; reproducing content information recorded on the super-resolution optical recording medium or the normal optical recording medium in response to the electric signal; and (i) reproducing and acquiring medium identification information in response to an electric signal obtained when the reproduction light is suitable for reproducing the normal optical recording medium with use of reproduction light having power suitable for reproduction of the normal optical recording medium, and (ii) acquiring blank region information indicative of presence of a blank region; determining, based on the medium identification information, whether or not a super-resolution optical recording medium is loaded; and controlling the content information reproducing section based on the blank region information so that the content information reproducing section stops an operation in the blank region.

According to the arrangement, the medium identification information is reproduced with the use of a laser beam having power suitable for a normal optical recording medium, and it is determined, based on the medium identification information, whether or not the super-resolution optical recording medium is loaded. Based on a result thus determined, the optical recording medium reproduction device can carry out processing in accordance with the optical recording medium (can change power of a laser beam in accordance with the optical recording medium). Further, in a case where the optical recording medium reproduction device acquires blank region information indicative of presence of the blank region, the optical recording medium reproduction device continues to carry out the servo control, but stops the reproduction of the content information in the blank region.

As such, it is possible to realize (i) a super-resolution optical recording medium in which a region on which medium identification information is recorded and a region on which content information is recorded are different in track pitch and in which a reproduction error hardly occurs when reproduction shifts from the region on which the medium identification information is recorded to the region on which the content information is recorded, (ii) an optical recording medium reproduction device which is capable of reproducing both of the super-resolution optical recording medium and a normal optical recording medium, and (iii) a control method of the optical recording medium reproduction device.

The optical recording medium reproduction device of the present invention is preferably arranged such that said control section further includes a power control section which, in a case where it is determined by the medium identification section that the super-resolution optical recording medium is loaded, controls and changes power of the reproduction light of the reproducing section into one suitable for reproduction of a content region or into one suitable for reproduction of the blank region.

According to the arrangement, the optical recording medium reproduction device can change power of the reproduction light in accordance with the loaded optical recording medium. Further, the optical recording medium reproduction device can change laser beam power into one suitable for the blank region. This further produces an effect that the optical recording medium reproduction device can reproduce, in the best condition, the medium and regions (e.g. blank region and content region).

It is possible to cause a computer to function as the control section of the optical recording medium reproduction device based on a control program for controlling the optical recording medium reproduction device. Further, it is possible to cause any computer to execute the control program for controlling the optical recording medium reproduction device by storing the control program in a computer-readable recording medium.

A super-resolution optical recording medium of one of the present inventions includes: a first region on which medium identification information which causes a medium type to be identified is recorded with use of trains of prepits each of which is constituted by prepits longer than a resolution limit of an optical system of an optical recording medium reproduction device; a second region on which content information is recorded with use of trains of prepits each of which includes a prepit equal to or shorter than the resolution limit of the optical system, the second region having a track pitch smaller than that of the first region; and a blank region provided between the first region and the second region so as to spirally connect the trains of prepits in the first region and the trains of prepits in the second region, the blank region including at least two tracks, a track pitch, between (i) a first one of said at least two tracks that is adjacent to a first one of the trains of prepits of the first region and (ii) the first one of the trains of prepits, being identical to a track pitch of the first region, a track pitch, between (i) a second one of said at least two tracks that is adjacent to a second one of the trains of prepits of the second region and (ii) the first one of the trains of prepits which is on the first region side, changing into a track pitch of the second region, and a track pitch, between (i) the second one of said at least two tracks and (ii) the second one of the trains of prepits being identical to the track pitch of the second region, and no information being recorded on the blank region.

As such, it is possible to realize a super-resolution optical recording medium in which a region on which medium identification information is recorded and a region on which content information is recorded are different in track pitch and in which a reproduction error hardly occurs when reproduction shifts from the region on which the medium identification information is recorded to the region on which the content information is recorded.

BRIEF DESCRIPTION OF DRAWINGS

FIG. 8 is a cross-sectional view of the super-resolution optical recording medium shown in FIG. 7.

Figure 1:
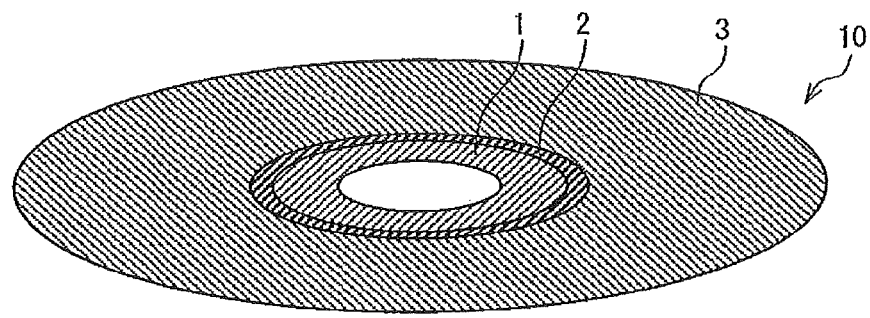
FIG. 1 is a view illustrating an external appearance of a super-resolution optical recording medium of an embodiment of the present invention.

REFERENCE SIGNS LIST 1, 1a, 1b, 11: Medium information region (first region)
2, 2a, 2b, 12: Blank region
3, 3a, 3b, 13: Content region (second region)
1A, 1B, 11A: Test read region
10, 10a, 10b, 20, 105: Super-resolution optical recording medium
26: Optical pickup (reproducing section)
31: Signal processing section (information acquisition section)
32: Medium identification section
33: Power control section
35: RF processing control section (blank control section)
36: Control section
37: Servo control section 39B: RF signal processing circuit (content information reproducing section)
50, 50a: Optical recording medium reproduction device

DESCRIPTION OF EMBODIMENTS

Embodiments of the present invention are described below with reference to FIGS. 1 through 12. Note that the term "length of prepit" or the term "prepit length" used herein refers to a length of a prepit in a tangential direction (in a direction normal to a radial direction of an optical recording medium). Note also that an optical recording medium on which various kinds of information are recorded with the use of a train of prepits constituted by prepits each longer than a resolution limit of an optical system which is included in an optical recording medium reproduction device (hereinafter referred to as "reproduction device") of the present invention is referred to as "normal medium" or "normal optical recording medium".

Embodiment 1

An embodiment of a super-resolution optical recording medium of the present invention is described below with reference to FIGS. 1 through 3. A super-resolution optical recording medium (hereinafter referred to as "super-resolution medium") 10 of the present embodiment is a reproduction-only medium, and is a super-resolution medium having a cross-sectional structure of a BD (Blu-ray Disc) type. According to the present embodiment, an optical system of a reproduction device has the following particulars: a laser wavelength is 405 nm, a numerical aperture of a converging lens is 0.85, and a resolution limit is 119 nm. Note that the characteristics of each semiconductor laser, which is operated in conformity with a standard such as a BD standard, vary from semiconductor laser to semiconductor laser due to their manufacturing process. On this account, in a case where a laser beam is described herein as having a laser wavelength of 405 nm, it means that the laser beam has a laser wavelength which falls in a range from 400 nm to 410 nm.

FIG. 1 is a view illustrating an external appearance of the super-resolution medium 10.

The super-resolution medium 10 includes a medium information region (first region) 1 on which medium information is recorded, a content region (second region) 3 on which content information such as video and software is recorded, and a blank region 2 provided between the medium information region 1 and the content region 3.

Figure 2:
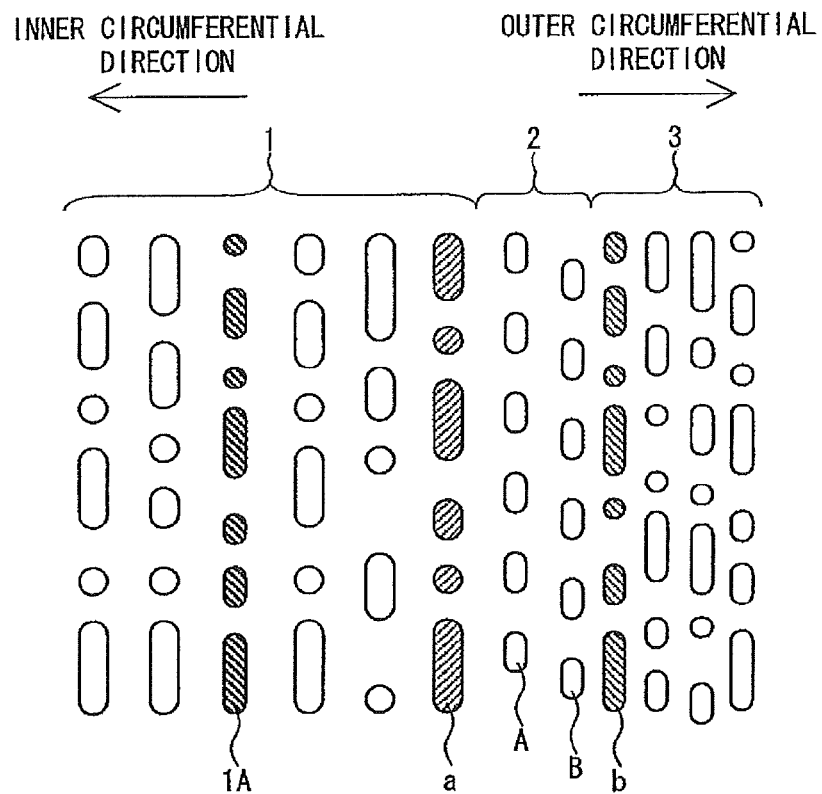
FIG. 2 is an enlarged view of a vicinity of a blank region of the super-resolution optical recording medium.

FIG. 2 is an enlarged view of a vicinity of the blank region 2.

The medium information is recorded, in conformity with the BD standard, on the medium information region 1 with the use of a train of prepits which is provided in a spiral manner and which is constituted by prepits and spaces which mainly have a length of 149 nm, 223.5 nm, 298 nm, 372.5 nm, 496 nm, 570.5 nm or 645 nm. Each of the prepits and spaces is longer than 119 nm which is the resolution limit of the optical system of the reproduction device. A track pitch is 320 nm in the medium information region 1.

The medium information recorded on the medium information region 1 includes information such as (i) medium identification information which indicates that a recording mode of the content region 3 is a super-resolution recording mode and which causes medium type of the super-resolution medium 10 to be identified, (ii) reproduction clock switching information which causes the reproduction device to switch to a reproduction clock, and (iii) address of recorded information.

As shown in FIG. 2, the medium information region 1 further includes a test read region 1A in which a train of prepits is provided for adjusting (setting) power of a laser beam with which the content region 3 is irradiated. Note that such laser beam power adjusted by use of the test read region 1A is equal to that of a laser beam with which the blank region 2 is irradiated.

The train of prepits in the test read region 1A contains a prepit that is identical to the shortest prepit in the content region 3, and is constituted only by prepits which are equal in length to those of the content region 3. The train of prepits in the test read region 1A forms a random pattern which is in conformity with a prepit width of the content region 3 and a modulation method of the content region 3. The train of prepits, having a length which corresponds to reference data, is provided in the test read region 1A so as to have a linear recording density identical to that of the content region 3. Further, the train of prepits of the test read region 1A can be provided in any region of the medium information region 1. Further, in a case where super-resolution media are the same in reference data, the reference data can be recorded in the reproduction device or can be recorded in a region other than the test read region 1, which region is in the medium information region 1.

The blank region 2 functions as a guide in a case where the reproduction device causes the optical system to move from the medium information region 1 to the content region 3 while carrying out tracking servo control. Further, A train of prepits is provided in the blank region 2 in which train of prepits having a length of 149 nm is spirally provided at regular intervals so as to spirally connect the train of prepits of the medium information region 1 and the train of prepits of the content region 3. Note that the train of prepits is provided so as to spirally go around at least twice in the blank region 2. In the present embodiment, the train of prepits is provided so as to spirally go around twice in the blank region 2. Note also that no information to be reproduced such as medium information and content information is recorded on the train of prepits in the blank region 2.

A depth of each of the prepits of the blank region 2 is not limited to a specific one, provided that such a depth allows the optical system of the reproduction device to detect a tracking error signal. A depth of approximately 65 nm which is in conformity with the BD standard causes no problem, in a case where a laser wavelength of the optical system of the reproduction device is 405 nm and the numerical aperture NA of the converging lens is 0.85, as with the present embodiment. The blank region 2 will be described later in detail.

The content information is recorded on the content region 3 with the use of a train of prepits, by spirally providing the train of prepits in which prepits and spaces are combined whose length is mainly 116 nm, 174 nm, 232 nm, 290 nm, 348 nm, 406 nm or 464 nm. That is, the train of prepits contains a prepit and a space whose length is 116 nm that is smaller than 119 nm that is the resolution limit of the optical system of the reproduction device. A track pitch in the content region 3 is 260 nm that is smaller than the track pitch in the medium information region 1. The content region 3 has a storage capacity which is around 1.6 times larger than that of a normal medium of BD type. Note that the storage capacity is calculated back based on the shortest prepit length and the track pitch.

Figure 3:
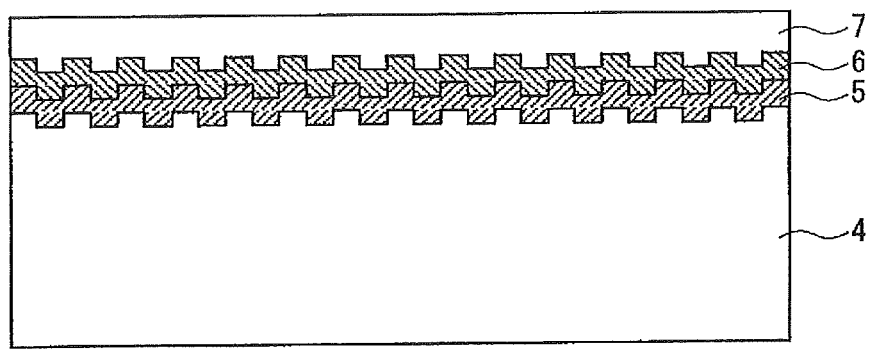
FIG. 3 is a cross-sectional view of the super-resolution optical recording medium.

FIG. 3 is a cross-sectional view of the super-resolution medium 10.

The super-resolution medium 10 is arranged such that (i) a reflecting layer 5 and a super-resolution function layer 6 which causes a super-resolution effect are stacked, in this order by sputtering, on a substrate 4 on which the prepits of each of the regions are provided and (ii) a cover layer 7 having translucency is provided on the super-resolution function layer 6.

The substrate 4 has a thickness of approximately 1.1 mm, and is made of polycarbonate. The reflecting layer 5 is a silicon layer having a thickness of 7 nm, and the super-resolution function layer 6 is a zinc oxide layer having a thickness of 155 nm. The cover layer 7 has a thickness of approximately 0.1 mm, and is made of polycarbonate. Note that the prepits of each of the regions are provided on the substrate 4 so as to have concave shape and/or convex shape.

In a case where the content region 3 is irradiated by a laser beam having power suitable for reproduction of the content region 3, heat is generated by the reflecting layer 5. The heat causes a light intensity distribution within a laser spot, which distribution causes temperature distribution. This ultimately causes optical transmittance distribution within the laser spot on the super-resolution function layer 6. As a result, the laser spot goes into a pseudo-reduction state. This allows a reproduction of the train of prepits in the content region 3, which train of prepits includes prepits shorter than the resolution limit of the optical system of the reproduction device, thereby making it possible to deal with more information than a normal medium. Note that the super-resolution function layer 6 is not limited to a specific structure, provided that the train of prepits in the content region 3 can be reproduced. The super-resolution function layer 6 can be a mask layer disclosed in Patent Literature 1 or a function layer disclosed in Patent Literature 2, for example. Note also that (i) the laser light power suitable for reproduction of the content region 3 is approximately 1.0 mW and (ii) laser light power suitable for reproduction of the medium information region 1 is approximately 0.3 mW which is the same as laser light power suitable for reproduction of a normal medium.

Further, the medium identification information recorded on the medium information region 1 can be reproduced with the use of a laser beam having power for the normal medium. This is because the medium identification information is recorded with the use of a train of prepits which is constituted by prepits longer than the resolution limit of the optical system of the reproduction device, i.e., the medium identification information is recorded in a similar manner to a normal medium. Therefore, the reproduction device (i) irradiates a medium, which is loaded into the reproduction device, with a laser beam having power for a normal medium so as to read out the medium identification information, and then (ii) determines, based on the medium identification information, whether the medium thus loaded is a normal medium or a super-resolution medium. Based on a result thus determined, the reproduction device can carry out processing in accordance with the medium thus loaded (can change, for example, the power of a laser beam in accordance with the medium thus loaded). This allows realization of a compatible reproduction device that is capable of reproducing both of a normal medium and the super-resolution medium 10.

The following description deals with the blank region 2 in more detail with reference to FIG. 2. Note that, for convenience of description, a train of prepits in the medium information region 1, which train of prepits is adjacent to the blank region 2, is referred to as "a train of prepits a", and a train of prepits in the content region 3 which train of prepits is adjacent to the blank region 2 is referred to as "a train of prepits b". Of the inner circumferential train of prepits and the outer circumferential train of prepits in the blank region 2, a train of prepits adjacent to the train of prepits a of the medium information region 1 is referred to as "a train of prepits A", and a train of prepits adjacent to the train of prepits b of the content region 3 is referred to as "a train of prepits B".

The train of prepits A of the blank region 2 is provided so as to be away, by a track pitch of 320 nm (by the track pitch of the medium information region 1), from the adjacent train of prepits a. The train of prepits B is provided so that a track pitch between the train of prepits B and the adjacent train of prepits A (the train of prepits on a first region side of the blank region 2) is reduced to 260 nm (the track pitch of the content region 3) from 320 nm while the train of prepits B goes around. The train of prepits B is provided so as to be away, by at a track pitch of 260 nm, from the adjacent train of prepits b.

Since the train of prepits A is provided so as to be away, by the track pitch of the medium information region 1, from the adjacent train of prepits a, a track pitch, on an identical radius within the medium information region 1, between the adjacent trains of prepits is equal to each other irrespective of the inner train of prepits or the outer train of prepits. Since, during the reproduction, (i) the medium information region 1 is less affected by noise caused by adjacent trains of prepits and (ii) the tracking servo control is appropriately carried out, there occurs no increase in reproduction error.

Further, since the train of prepits B is provided so that a track pitch between the train of prepits B and the adjacent train of prepits A is reduced to the track pitch of the content region 3 from the track pitch of the medium information region 1, the tracking servo control can be stably carried out with respect to the track pitch in the content region 3.

The tracking servo control tends to become unstable in the blank region 2 since (i) a track pitch between the train of prepits A and the train of prepits B is different from (a) a track pitch between the train of prepits A and the adjacent train of prepits a and (b) a track pitch between the train of prepits B and the adjacent train of prepits b and (ii) a track pitch between the train of prepits A and the train of prepits B changes while the train of prepits A and the train of prepits B go around.

Therefore, if the blank region 2 contains information to be reproduced such as medium information and content information, such unstable tracking servo control causes a reduction in margin for external disturbances such as a tilt of the medium in a circumferential direction (tangential tilt), a tilt of the medium in a radial direction (radial tilt), and a small fluctuation in laser beam power, thereby making the reproduction error more likely to occur.

However, no reproduction error occurs since no information to be reproduced such as medium information and content information is recorded on the blank region 2, as described above.

Further, the train of prepits B is provided so as to be away, by the track pitch of the content region 3, from the adjacent train of prepits b. This allows the reproduction of the content region 3 to be less affected by noise which is caused by an adjacent train of prepits, thereby making it possible to properly carry out the tracking servo control. As a result, there is no increase in reproduction error.

In this manner, the provision of the blank region 2 allows proper reproductions of the medium information region 1 and the content region 3 without causing an increase in reproduction error, although the medium information region 1 and the content region 3 are different in recording mode and track pitch. This allows the super-resolution medium 10 to have larger storage capacity than a normal medium, and to be reproduced in a single reproduction device which can reproduce a normal medium.

Further, there is no rapid change in track pitch because of the presence of the blank region 2. This produces a further effect, during manufacturing of a master disc, that it is possible to more easily control a speed at which a slider, provided in an exposure apparatus, is moved in a radial direction. This is described below in detail.

The exposure apparatus used in manufacturing the master disc includes (i) a laser light source, (ii) a stage for fixing and rotating a substrate on which a photoresist layer is deposited, and (iii) a slider having components such as a lens for converging a laser beam onto the photoresist layer provided on the substrate (the laser light source and the slider can integrally move). The stage on which the substrate is fixed is rotated, exposure is carried out while the slider is being moved in the radial direction with respect to the center of the rotation of the stage, and then development is carried out. This allows production of a spiral shaped pattern of trains of prepits and/or a pattern of guide grooves. In a case where the medium information region 1 and the content region 3 which are different in track pitch are adjacently provided, it becomes difficult to control the speed at which the slider is moved in the radial direction, thereby causing a deviation from a desired radius position. This is because it is necessary to make a rapid change in the speed at which the slider is moved in the radial direction so as to respond to a change in track pitch. However, in a case where the blank region 2 is provided as in the Embodiment 1, it is possible to reduce a change in the speed at which the slider is moved in the radial direction. Because this gives rise to easier control of the slider, it becomes less likely to cause a deviation from the desired radial position.

The super-resolution medium 10 thus described is a suitable example, and can be modified as follows, for example.

The reflecting layer 5 can be made of a material such as aluminum, silver, gold, Ge or their mixture, provided that sufficient amount of reflection can be obtained. Further, the super-resolution function layer 6 can be made of a material such as $CeO_2$, $TiO_2$, GeSbTe or AgInSbTe. Further, the cover layer 7 can be prepared by a method such as a method of bonding a film with the use of a UV cured resin or by a spin coat method.

Further, the blank region 2 is not limited in particular, provided that (i) the optical system of the reproduction device can move while carrying out tracking, and (ii) the blank region 2 includes a prepit of not less than the shortest prepit of the trains of prepits in the content region 3. Further, the prepits in the blank region 2 can be not less than two types of prepits, having respective different lengths, which are randomly provided so as not to comply with any signal modulation method of an optical recording medium. This is because no information to be reproduced such as medium information or content information is recorded on the blank region 2.

The present embodiment has dealt with a case where the medium information region 1 is provided in the innermost part of the super-resolution medium 10. However, the medium information region 1 can be provided in an outer circumferential part of the super-resolution medium 10 or can be provided in an inner circumferential part and in the outer circumferential part of the super-resolution medium 10, provided that the blank region 2 is provided between the medium information region 1 and the content, region 3.

The present embodiment has dealt with a case where the medium information region 1 includes the test read region 1A. However, another arrangement is possible in which (i) the medium information region 1 includes, instead of the test read region 1A, a region, on which power information indicative of power of a laser beam with which the content region 3 is irradiated, is recorded, and (ii) the reproduction device reproduces the power information so as to recognize power of a laser beam suitable for reproduction of the content region 3. Further, in a case where a plurality of super-resolution media are the same in laser beam power suitable for reproduction of the content region, such laser beam power can be recorded in the reproduction device instead of providing the test read region 1A.

Further, for example, the medium information region 1 can include several regions that are different in track pitch so that test reproduction of a super-resolution medium can be carried out.

Further, a super-resolution optical recording medium of the present invention is not limited to the one thus described, and can be a recordable super-resolution optical recording medium. For example, the super-resolution optical recording medium may be arranged so as to include a first region (medium information region) in which tracks each constituted by wobbles (meandering guide grooves) are provided, and a second region on which content information is recorded with the use of recording marks and spaces. Similar effects can be obtained even in such a super-resolution optical recording medium in a case where the blank region on which no information is recorded is provided. In this case, it is only necessary that tracks in the blank region each of which tracks is constituted by wobbles be provided so as to connect the tracks in the first region and the tracks in the second region. Since medium identification information can be recorded on the first region on the basis of a cycle of the wobbles or the like, information indicating (i) that the blank region is present and (ii) that no information is recorded on the blank region can be recorded on the first region.

With this arrangement, the optical system of the reproduction device can smoothly move from the first region to the second region while consecutively carrying out tracking servo control. Further, even if the tracking servo control becomes unstable in the blank region, such unstable tracking servo control causes no reproduction error since no information is recorded on the blank region. This allows realization of a recordable super-resolution optical recording medium (i) which includes a first region and a second region which has a track pitch smaller than that of the first region, and (ii) in which a reproduction error is hard to occur when reproduction shifts from the first region to the second region. Thus, the present invention can be applied not only to a reproduction only BD-ROM (Blu-ray Disc Read Only Memory), but also to a recordable BD-R (Blu-ray Disc Recordable) and a BD-RE (Blu-ray Disc Rewritable).

Further, tracks in each of the first region, the second region, and the blank region are not limited to wobbles. Each of the tracks in the first region and the blank region may be arranged so as to include prepits and/or guide grooves as in the reproduction-only medium of the Embodiment 1, and each of the tracks in the second region may be arranged so as to include guide grooves.

Embodiment 2

Another embodiment of a super-resolution medium of the present invention is described below with reference to FIGS. 4 and 5. For convenience of description, constituents which have identical functions to those of the Embodiment 1 are given identical reference numerals, and are not explained repeatedly. Basically, the following description deals with differences from the super-resolution medium 10 of the Embodiment 1.

Figure 4:
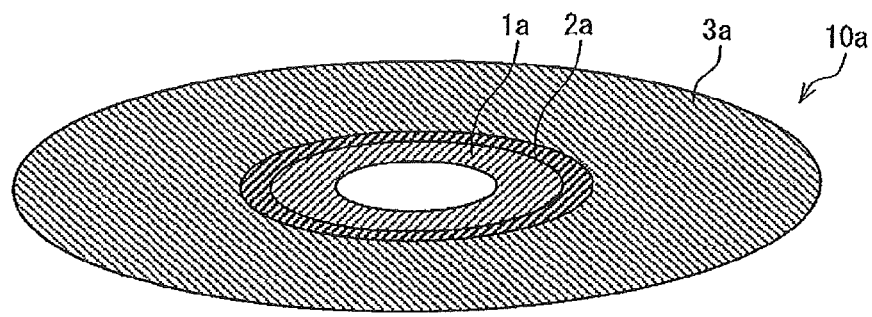
FIG. 4 is a view illustrating an external appearance of a super-resolution optical recording medium of another embodiment of the present invention.

FIG. 4 is a view illustrating an external appearance of a super-resolution medium 10a of the present embodiment.

The super-resolution medium 10a includes a medium information region (first region) 1a on which medium information is recorded, a content region (second region) 3a on which content information such as video or software is recorded, and a blank region 2a provided between the medium information region 1a and the content region 3a.

Figure 5:
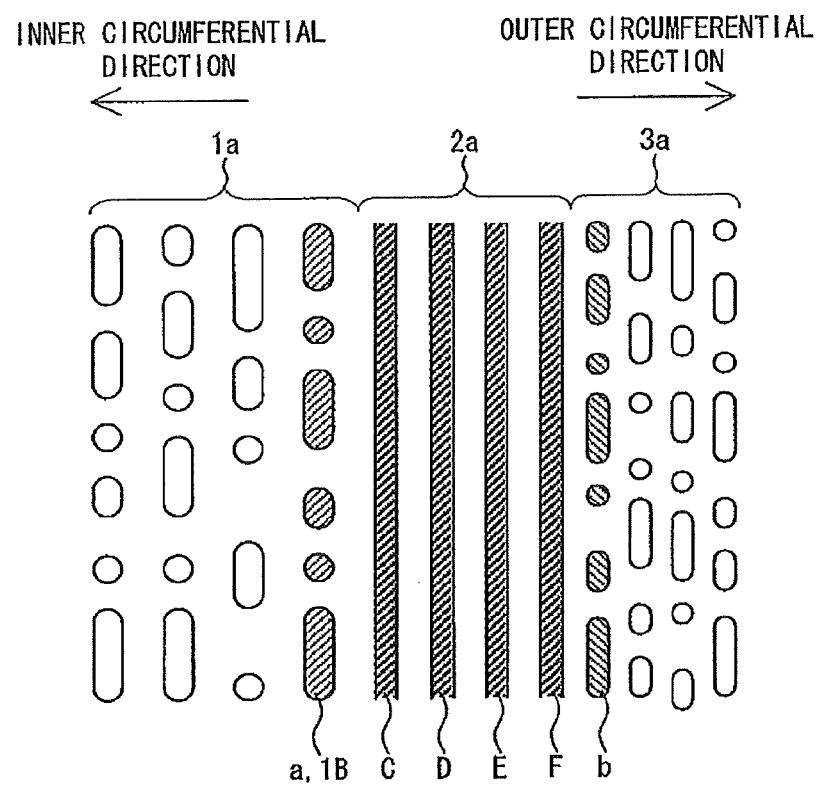
FIG. 5 is an enlarged view of a vicinity of a blank region of the super-resolution optical recording medium shown in FIG. 4.

FIG. 5 is an enlarged view of a vicinity of the blank region 2a.

The medium information region 1a is different from the medium information region 1 of the super-resolution medium 10 in that first address information indicative of a starting position of the blank region 2a is additionally recorded. The content region 3a is different from the content region 3 of the super-resolution medium 10 in that second address information indicative of an end position of the blank region 2a is additionally recorded.

In a case where such address information indicative of a position of the blank region 2a is recorded as described above, the reproduction device (i) can recognize the position of the blank region 2a so as to carry out proper processing (e.g. change laser beam power of the reproduction device) (see Embodiments 5 and 6 for details) with respect to the blank region 2a and the content region 3a, and (ii) can cause the optical system to consecutively jump to an adjacent track in the blank region 2a so as to smoothly shift to reproduction of the content region 3a in a relatively short time period.

The medium information region 1a includes a test read region 1B instead of the test read region 1A. A train of prepits in the test read region 1B includes a prepit that is identical to the shortest prepit of the content region 3a, and is constituted only by prepits whose lengths are equal to those of the content region 3. The train of prepits in the test read region 1B forms a random pattern which is in conformity with a prepit width of the content region 3a and a modulation method of the content region 3a. The train of prepits having a length which corresponds to reference data is provided in the test read region 1B so as to have a linear recording density identical to that of the content region 3. The train of prepits in the test read region 1B can be provided in any region of the medium information region 1a. According to the present embodiment, the train of prepits in the test read region 1B is provided in a track in the medium information region 1a which track is adjacent to the blank region 2a. Note that the reference data can be recorded in the reproduction device or can be recorded in a region other than the test read region 1B which region is in the medium information region 1a in a case where super-resolution media are the same in reference data.

The blank region 2a is different from the blank region 2 of the super-resolution medium 10 in that guide grooves are used instead of the train of prepits in the blank region 2. A guide groove is provided in the blank region 2a so as to spirally go around at least twice in the black region 2a. In the present embodiment, a guide groove is provided so as to spirally go around four times in the blank region 2a. A depth of each of the guide grooves in the blank region 2a is not limited to a specific one, provided that such a depth allows an optical system of a reproduction device to detect a tracking error signal. A depth of approximately 65 nm which is in conformity with BD standard causes no problem in a case where (i) the optical system of the reproduction device has a laser wavelength of 405 nm, and (ii) numerical aperture NA of a converging lens is 0.85 as in the present embodiment.

The following description deals with the blank region 2a in more detail. For convenience of description, among the four guide grooves in the blank region 2a, a guide groove that is adjacent to a train of prepits a in the medium information region 1a is hereinafter referred to as "a guide groove C", and a guide groove that is adjacent to the guide groove C is hereinafter referred to as "a guide groove D". Further, of the guide grooves adjacent to the guide groove D, a guide groove that is nearer to the content region 3a is hereinafter referred to as "a guide groove E", and a guide groove that is adjacent to the guide groove E and the train of prepits b in the content region 3a is hereinafter referred to as "a guide groove F".

The guide groove C in the blank region 2a is provided so as to be away, by a track pitch of 320 nm (by a track pitch of the medium information region 1a), from the adjacent train of prepits a. A track pitch between the guide grooves C and D is smaller by approximately 18 nm than that between the train of prepits a and the guide groove C, and a track pitch between the guide grooves D and E is smaller by approximately 18 nm than that between the guide grooves C D, and a track pitch between the guide grooves E and F is smaller by approximately 18 nm than that between the guide grooves D and E. Consequently, the guide groove F is away from the adjacent guide groove E by a track pitch of approximately 260 nm (by a track pitch of the content region 3a). Further, the guide groove F is away from the adjacent train of prepits b by a track pitch of 260 nm.

The blank region 2a provided in this manner allows proper reproduction of the medium information region 1a and the content region 3a without causing an increase in reproduction error, although the medium information region 1a and the content region 3a are different in recording mode and track pitch. This allows the super-resolution medium 10a to have larger storage capacity than a normal medium, and to be reproduced in a single reproduction device which can also reproduce a normal medium.

Since the four guide grooves are provided in the blank region 2a, the blank region 2a is larger than the blank region 2 of the Embodiment 1. This allows a reduction in amount of change in track pitch per unit length in a radial direction. As such, it is possible to more easily control speed at which a slider is moved in a radial direction in an exposure step during manufacturing a master disc, thereby making a deviation from a desired radius position less likely to occur.

Further, the optical system of the reproduction device can carry out tracking servo control more stably while traveling through the blank region 2a. This allows an increase in margin for external disturbances and the like. As such, the optical system can more smoothly move from the medium information region 1a to the content region 3a.

In a case where it is desired that storage capacity be secured as much as possible in a super-resolution medium, it is only necessary to make the blank region as small as possible, for example, by causing the guide groove in the blank region to go around twice as in the Embodiment 1. Further, at a certain position in a circumferential direction, a track pitch between adjacent trains of prepits or guide grooves may become smaller as a distance from an inner periphery becomes larger. Specifically, such a track pitch may become smaller as follows as a distance from an inner periphery becomes larger: 320 nm, approximately 310 nm, approximately 280 nm, approximately 270 nm, approximately 265 nm, 260 nm. This makes it easier to manufacture a master disc of an optical recording medium. That is, in a case where an amount of change in speed at which a slider is moved in a radial direction of the master disc becomes smaller from a certain point as above, the speed at which the slider is moved tends to become stable when a track pitch between a train of prepits or a guide groove and an adjacent train of prepits or guide groove on an inner periphery side is 260 nm.

The super-resolution medium 10a thus described is a suitable example, and can be modified as described in the Embodiment 1 or can be modified as follows, for example.

The present embodiment has dealt with a case where the address information of the blank region 2a is recorded on each of the medium information region 1a and the content region 3a, but does not intend to limit to this. Such address information may be recorded on the medium information region 1a in a different information state, for example.

Alternatively, the medium information region 1a may contain, instead of the address information of the blank region 2a, address information indicative of location of the content region 3a. In a case where the address information of the content region 3a is recorded on the medium information region 1a, the reproduction device (i) can recognize the position of the blank region 2a and the content region 3a so as to carry out proper processing (e.g. change laser beam power of the reproduction device) (see Embodiments 5 and 6 for details) with respect to the blank region 2a and the content region 3a, and (ii) can cause the optical system to consecutively jump to an adjacent track in the blank region 2 so as to speedily access a starting position or a desired position of the content region 3a and smoothly shift to reproduction of the content region 3a in a relatively short time period.

The present embodiment has dealt with a case where the medium information region 1a includes the test read region 1B. However, another arrangement is possible in which (i) the medium information region 1a includes, instead of the test read region 1B, a region, on which power information indicative of power of a laser beam with which the content region 3a is irradiated, is recorded, and (ii) the reproduction device reproduces the power information so as to recognize power of a laser beam suitable for reproduction of the content region 3a. Further, the test read region 1B may be substituted by a test read region 11A of Embodiment 4 later described. Further, in a case where a plurality of super-resolution media are the same in laser beam power suitable for reproduction of the content region, such laser beam power can be recorded in the reproduction device instead of providing the test read region 1B.

A train of prepits can be provided in the blank region 2a so as to spirally go around at least twice as in the Embodiment 1. Alternatively, a train of prepits and guide groove can be provided in the blank region 2a so as to spirally go around at least twice as in the Embodiment 3 described below.

Embodiment 3

Another embodiment of a super-resolution medium of the present invention is described below with reference to FIG. 6. For convenience of description, constituents which have identical functions to those of the Embodiment 2 are given identical reference numerals, and are not explained repeatedly. Basically, the following description deals with differences from the super-resolution medium 10a of the Embodiment 2.

Figure 6:
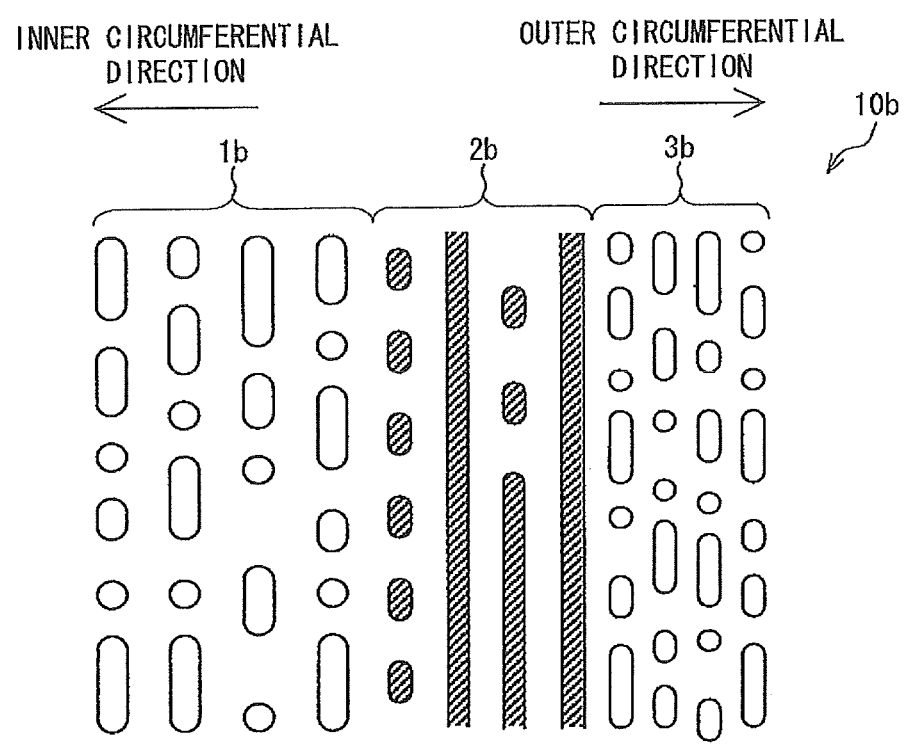
FIG. 6 is an enlarged view of a vicinity of a blank region of a super-resolution optical recording medium of still another embodiment of the present invention.

FIG. 6 is an enlarged view of a vicinity of a blank region 2b of a super-resolution medium 10b of the present embodiment.

The medium information region 1b is different from the medium information region 1a of the super-resolution medium 10a in that blank power information indicative of power of a laser beam with which the blank region 2b is irradiated is additionally recorded. The reproduction device reproduces the blank power information so as to recognize power of a laser beam suitable for blank region 2b. Note that the laser beam power suitable for the blank region 2b may be smaller than that suitable for reproduction of the content region 3b. In such a case, it is possible to reduce power consumption of the reproduction device since the reproduction device can accurately recognize the laser beam power suitable for the blank region 2b based on the blank power information.

The content region 3b is arranged in a similar manner to the content region 3a of the super-resolution medium 10a.

The blank region 2b is different from the blank region 2a of the super-resolution medium 10a in that a combination of a train of prepits and a guide groove is used instead of the guide grooves. The train of prepits and guide groove are provided in the blank region 2b so as to spirally go around at least twice. In the present embodiment, the train of prepits and guide groove are provided in the blank region 2b so as to spirally go around four times. A track pitch in the blank region 2b is similar to that in the blank region 2a. Further, the train of prepits in the blank region 2b is similar to that in the blank region 2. Specifically, the train of prepits in the blank region 2b includes prepits each of which has a length of 149 nm and which are disposed at regular intervals. Further, the guide groove in the blank region 2b is similar to that in the blank region 2a.

As in the Embodiments 1 and 2, the blank region 2b provided in this manner allows proper reproduction of the medium information region 1b and the content region 3b without causing an increase in reproduction error, although the medium information region 1b and the content region 3b are different in recording mode and track pitch. This allows the super-resolution medium 10b to have larger storage capacity than a normal medium, and to be reproduced in a single reproduction device which can reproduce a normal medium.

Embodiment 4

Another embodiment of a super-resolution medium of the present invention is described below with reference to FIGS. 7 and 8. A super-resolution medium 20 of the present embodiment is a reproduction only medium and is a super-resolution medium having a cross-section structure of HD_DVD (High Definition Digital Versatile Disc) type. According to the present embodiment, an optical system of a reproduction device has the following particulars: a laser wavelength is 405 nm, a numerical aperture of a converging lens is 0.65, and a resolution limit of the optical system is 156 nm.

The super-resolution medium 20 includes a medium information region (first region) 11 on which medium information is recorded, a content region (second region) 13 on which content information such as video or software is recorded, and a blank region 12 provided between the medium information region 11 and the content region 13.

Figure 7:
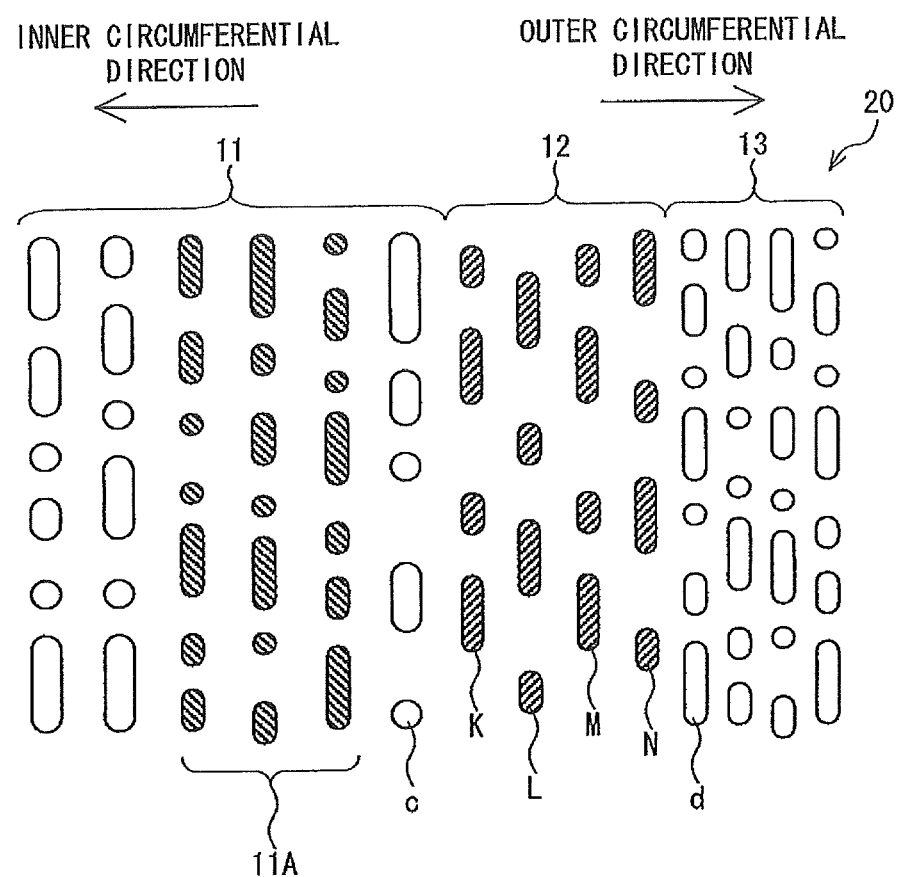
FIG. 7 is an enlarged view of a vicinity of a blank region of a super-resolution optical recording medium of still another embodiment of the present invention.

FIG. 7 is an enlarged view of a vicinity of the blank region 12.

The medium information is recorded, in conformity with the HD_DVD standard, on the medium information region 11 with the use of a train of prepits which is provided in a spiral manner and which is constituted by prepits and spaces, the shortest prepit having a length of 204 nm. Note that each of the prepits and spaces in the train of prepits longer than 156 nm which is the resolution limit of the optical system of the reproduction device. Further, note that a track pitch in the medium information region 11 is 400 nm.

The medium information recorded on the medium information region 11 includes information such as (i) medium identification information which indicates that the content region 13 is recorded in a super-resolution recording mode and which causes medium type of the super-resolution medium 20 to be identified, (ii) reproduction clock switching information which causes the reproduction device to switch to a reproduction clock, (iii) information indicative of address of the recorded information, and (iv) first address information indicative of a starting position of the blank region 12.

As shown in FIG. 7, the medium information region 11 includes a test read region 11A in which a train of prepits is provided for adjusting (setting) power of a laser beam with which the reproduction device irradiates the content region 13. Note that such laser beam power adjusted by use of the test read region 11A is equal to that of a laser beam with which the blank region 12 is irradiated.

The train of prepits in the test read region 11A contains a prepit that is identical to the shortest prepit of the content region 13, and is constituted only by prepits whose lengths are equal to those of the prepits of the content region 13. The train of prepits in the test read region 11A forms a random pattern which is in conformity with a prepit width of the content region 13 and a modulation method of the content region 13. The train of prepits having a length which corresponds to reference data are provided in the test read region 11A so as to have a linear recording density identical to that in the content region 13. Each time a medium is loaded into a reproduction device, a train of prepits having a length which corresponds to the reference data is randomly selected so that test read can be carried out. The train of prepits in the test read region 11A can be provided in any region of the medium information region 11. Further, in a case where super-resolution media are the same in reference data, the reference data can be recorded in the reproduction device or can be recorded in a region other than the test read region 11A, which region is in the medium information region 11.

Since the test read is carried out while laser beam power is being changed, a train of prepits may be irradiated with a laser beam having power larger than that suitable for the content region 13. In a case where there is only one train of prepits having a length which corresponds to the reference data, a medium is likely to be damaged since the only one train of prepits is repeatedly irradiated with the laser beam. In view of this, a plurality of trains of prepits each having a length which corresponds to the reference data are provided as described above so that it is possible to prevent the medium from being damaged.

The blank region 12 serves as a guide in a case where the reproduction device causes the optical system to move from the medium information region 11 to the content region 13 while carrying out tracking servo control. The train of prepits in the blank region 12 is spirally provided so as to spirally connect the train of prepits in the medium information region 11 and the train of prepits in the content region 13. The train of prepits in the blank region 12 is arranged such that a prepit having a length of 204 nm, a space having a length of 204 nm, a prepit having a length of 408 nm, and a space having a length of 408 nm are repeatedly provided in this order. The train of prepits in the blank region 12 is provided so as to spirally go around at least twice. In the present embodiment, the train of prepits in the blank region 12 is provided so as to spirally go around four times. Further, no information to be reproduced such as medium information or content information is recorded on the blank region 12.

Further, a depth of each of the prepits in the blank region 12 is not limited to a specific one, provided that such a depth allows the optical system of the reproduction device to detect a tracking error signal. A depth of approximately 78 nm causes no problem in a case where a laser wavelength of the optical system of the reproduction device is 405 nm, and the numerical aperture of the converging lens is 0.65. The blank region 12 is described later in detail.

The content information is recorded on the content region 13 with the use of a train of prepits which is provided in a spiral manner and which includes prepits and spaces smaller than 156 nm which is the resolution limit of the optical system of the reproduction device, the shortest prepit having a length of 150 nm. Further, second address information indicative of an end position of the blank region 12 is recorded on the content region 13. A track pitch in the content region 13 is 320 nm which is smaller than that in the medium information region 11.

In a case where such address information indicative of location of the blank region 12 is recorded, the reproduction device (i) can recognize the location of the blank region 12 so as to carry out proper processing (e.g. change laser beam power of the reproduction device) with respect to the blank region 12 and the content region 13, and (ii) can cause the optical system to consecutively jump to an adjacent track in the blank region 12 so as to smoothly shift to reproduction of the content region 13 in a relatively short time period.

FIG. 8 is a cross-sectional view of the super-resolution medium 20.

The super-resolution medium 20 is arranged such that (i) a reflecting layer 16 and a super-resolution function layer 17 which causes a super-resolution effect are stacked in this order by sputtering on a substrate 15 on which the prepits of each of the regions are provided, and (ii) a substrate 18 having translucency is provided on the super-resolution function layer 17.

The substrate 15 has a thickness of approximately 0.6 mm, and is made of polycarbonate. The reflecting layer 16 is a silicon layer having a thickness of 7 nm, and the super-resolution function layer 17 is a zinc oxide layer having a thickness of 155 nm. The substrate 18 has a thickness of approximately 0.6 mm, and is made of polycarbonate. Note that the prepits of each of the regions are provided on the substrate 15 so as to have concave shape and/or convex shape.

In a case where the content region 13 is irradiated by a laser beam having power suitable for reproduction of the content region 13, heat is generated by the reflecting layer 16. The heat causes a light intensity distribution within a laser spot, which distribution causes temperature distribution. This ultimately causes optical transmittance distribution within the laser spot on the super-resolution function layer 17. As a result, the laser spot goes into a pseudo-reduction state. This allows a reproduction of the train of prepits in the content region 13 which train of prepits includes prepits shorter than the resolution limit of the optical system of the reproduction device, thereby making it possible to deal with more information than a normal medium. Note that the super-resolution function layer 17 is not limited to a specific structure, provided that the train of prepits in the content region 13 can be reproduced. The super-resolution function layer 17 can be a mask layer disclosed in Patent Literature 1 or a function layer disclosed in Patent Literature 2, for example.

Further, the medium identification information recorded on the medium information region 11 can be reproduced with the use of a laser beam having power suitable for a normal medium. This is because the medium identification information is recorded with the use of a train of prepits which is constituted by prepits longer than the resolution limit of the optical system of the reproduction device, i.e., the medium identification information is recorded in a similar manner to a normal medium. Therefore, the reproduction device (i) irradiates a medium, which is loaded into the reproduction device, with a laser beam having power for a normal medium so as to read out the medium identification information, and then (ii) determines, based on the medium identification information, whether the medium thus loaded is a normal medium or a super-resolution medium. Based on a result thus determined, the reproduction device can carry out processing in accordance with the medium thus loaded (can change, for example, the power of a laser beam in accordance with the medium thus loaded). This allows realization of a compatible reproduction device that is capable of reproducing both of a normal medium and the super-resolution medium 20. Note that laser beam power suitable for reproduction of the medium information region 11 is approximately 0.3 mW which is the same as laser beam power suitable for reproduction of a normal medium.

The following description deals with the blank region 12 in more detail with reference to FIG. 7. Note that, for convenience of description, a train of prepits in the medium information region 11 which train of prepits is adjacent to the blank region 12 is hereinafter referred to as "a train of prepits c", and a train of prepits in the content region 13 which train of prepits is adjacent to the blank region 12 is hereinafter referred to as "a train of prepits d". Further, of the four trains of prepits in the blank region 12, a train of prepits that is adjacent to the train of prepits c in the medium information region 11 is hereinafter referred to as "a train of prepits K", and a train of prepits that is adjacent to the train of prepits K and nearer to the content region 13 than the train of prepits c is hereinafter referred to as "a train of prepits L". Further, a train of prepits that is adjacent to the train of prepits L and is nearer to the content region 13 than the train of prepits K is hereinafter referred to as "a train of prepits M", and a train of prepits that is adjacent to the train of prepits M and the train of prepits d is hereinafter referred to as "a train of prepits N".

The train of prepits K in the blank region 12 is provided so as to be away, by a track pitch of 400 nm (by a track pitch of the medium information region 11), from the adjacent train of prepits c. A track pitch between the trains of prepits K and L is smaller by approximately 20 nm than that between the trains of prepits c and K, and a track pitch between the trains of prepits L and M is smaller by approximately 20 nm than that between the trains of prepits K and L, and a track pitch between the trains of prepits M and N is smaller by approximately 20 nm than that between the trains of prepits L and M. Consequently, the train of prepits N is provided so as to be away, by a track pitch of approximately 320 nm, from the adjacent train of prepits M. Further, the train of prepits N is provided so as to be away, by a track pitch of 320 nm, from the adjacent train of prepits d.

As in the Embodiments 1 through 3, the blank region 12 provided in this manner allows proper reproduction of the medium information region 11 and the content region 13 without causing an increase in reproduction error, although the medium information region 11 and the content region 13 are different in recording mode and track pitch. This allows the super-resolution medium 20 to have larger storage capacity than a normal medium, and to be reproduced in a single reproduction device which can reproduce a normal medium.

Further, since the four guide grooves are provided in the blank region 12, the blank region 12 has a large area. Because of this, there is no rapid change in track pitch. This makes it possible to easily control a speed at which a slider is moved during manufacturing of a master disc. Further, the reproduction device can carry out tracking servo control more stably while causing the optical system to travel through the blank region 12. This allows an increase in margin for external disturbances and the like, thereby allowing the optical system to more smoothly move from the medium information region 11 to the content region 13.

In a case where it is desired that storage capacity be secured as much as possible in a super-resolution medium, it is only necessary to make the blank region 12 as small as possible, for example, by causing the train of prepits in the blank region 12 to go around twice as in the Embodiment 1. Further, at a certain position in a circumferential direction, a track pitch between a train of prepits or a guide groove and an adjacent train of prepits or guide groove on the inner circumferential side may become smaller as a distance from an inner periphery becomes larger. Specifically, such a track pitch may become smaller as follows as a distance from an inner periphery becomes larger: 400 nm, approximately 385 nm, approximately 360 nm, approximately 330 nm, approximately 325 nm, 320 nm. This makes it easier to manufacture a master disc of an optical recording medium. Specifically, in a case where an amount of change in speed at which a slider is moved in a radial direction of the master disc becomes smaller from a certain point as above, the speed at which the slider is moved tends to become stable when a track pitch between a train of prepits or a guide groove and an adjacent train of prepits or guide groove on the inner circumferential side is 320 nm.

The super-resolution medium 20 thus described is a suitable example, and can be modified as follows, for example.

The reflecting layer 16 can be made of any material, provided that sufficient amount of reflection can be obtained. The super-resolution function layer 17 can be made of a material such as $CeO_a$, $TiO_s$, GeSbTe or AgInSbTe, for example. The substrate 18 can be prepared by a method such as a method of bonding a film with the use of a UV cured resin or by a spin coat method.

Further, the blank region 12 is not limited in particular, provided that (i) the optical system of the reproduction device can move while carrying out tracking, and (ii) the blank region 12 includes a prepit of not less than the shortest prepit of the trains of prepits in the content region 13. Further, the train of prepits in the blank region 12 may be substituted by the guide groove of the Embodiment 2 which guide groove spirally goes around at least twice or the combination of train of prepits and guide groove of the Embodiment 3 which train of prepits and guide groove spirally go around at least twice. A depth of each of the guide grooves is not limited to a specific one, provided that such a depth allows the optical system of the reproduction device to detect a tracking error signal. A depth of approximately 40 nm causes no problem in a case where the optical system is set as described in the present embodiment. Further, the train of prepits or the combination of train of prepits and guide grooves in the blank region 12 can be not less than two types of prepits, having respective different lengths, which are randomly provided so as not to comply with any signal modulation method of an optical recording medium. This is because no information to be reproduced such as medium information or content information is recorded on the blank region 2.

Further, the present embodiment has dealt with an arrangement in which the address information of the blank region 12 is recorded on each of the medium information region 11 and the content region 13, but does not intent to limit to this. Alternatively, the address information of the blank region 12 may be recorded on the medium information region 11 in a different information state.

The medium information region 11 may contain, instead of the address information of the blank region 12, address information indicative of location of the content region 13. In a case where the address information of the content region 13 is recorded on the medium information region 11, the reproduction device (i) can recognize the location of the blank region 12 and the content region 13 so as to carry out proper processing (e.g. change laser beam power of the reproduction device) with respect to the blank region 12 and the content region 13, and (ii) can cause the optical system to consecutively jump to an adjacent track in the blank region 12 so as to speedily access a starting position or a desired position of the content region 13 and smoothly shift to reproduction of the content region 13 in a relatively short time period.

The present embodiment has dealt with a case where the medium information region 11 includes the test read region 11A. However, another arrangement is possible in which (I) the medium information region 11 includes, instead of the test read region 11A, a region, on which power information indicative of power of a laser beam with which the content region 13 is irradiated, is recorded, and (ii) the reproduction device reproduces the power information so as to recognize power of a laser beam suitable for reproduction of the content region 13. The test read region 11A may be substituted by the test read region 1A of the Embodiment 1. Further, in a case where a plurality of super-resolution media are the same in laser beam power suitable for reproduction of the content region, such laser beam power can be recorded in the reproduction device instead of providing the test read region 11A.

The medium information region 11 may contain blank power information indicative of power of a laser beam with which the blank region 12 is irradiated. The reproduction device reproduces the blank power information so as to recognize laser beam power suitable for the blank region 12. Note that the laser beam power suitable for the blank region 12 may be smaller than that suitable for reproduction of the content region 13. In such a case, it is possible to reduce power consumption of the reproduction device since the reproduction device can accurately recognize the laser beam power suitable for the blank region 12 based on the blank power information.

Each of the Embodiments 1 through 4 has discussed super-resolution media such as BD-ROM (Blu-ray Disc Read Only Memory), BD-R (Blu-ray Disc Recordable), BD-RE (Blu-ray Disc Rewritable) and HD_DVD. However, a super-resolution medium of the present invention is also applicable to CD-ROM (Compact Disc Read Only Memory), CD-R (Compact Disc Recordable), CD-RW (Compact Disc Rewritable), DVD-ROM (Digital Versatile Disc Read Only Memory), DVD-R (Digital Versatile Disc Recordable), and DVD-RW (Digital Versatile Disc Rewritable).

Embodiment 5

An embodiment of a reproduction device of the present invention is described below with reference to FIGS. 9 through 11. The present embodiment discusses, as examples, (i) a case where a normal medium is reproduced with the use of a reproduction device 50 of the present embodiment and (ii) a case where the super-resolution medium 10a of the Embodiment 2 is reproduced with the use of the reproduction device 50 of the present embodiment.

Figure 9:
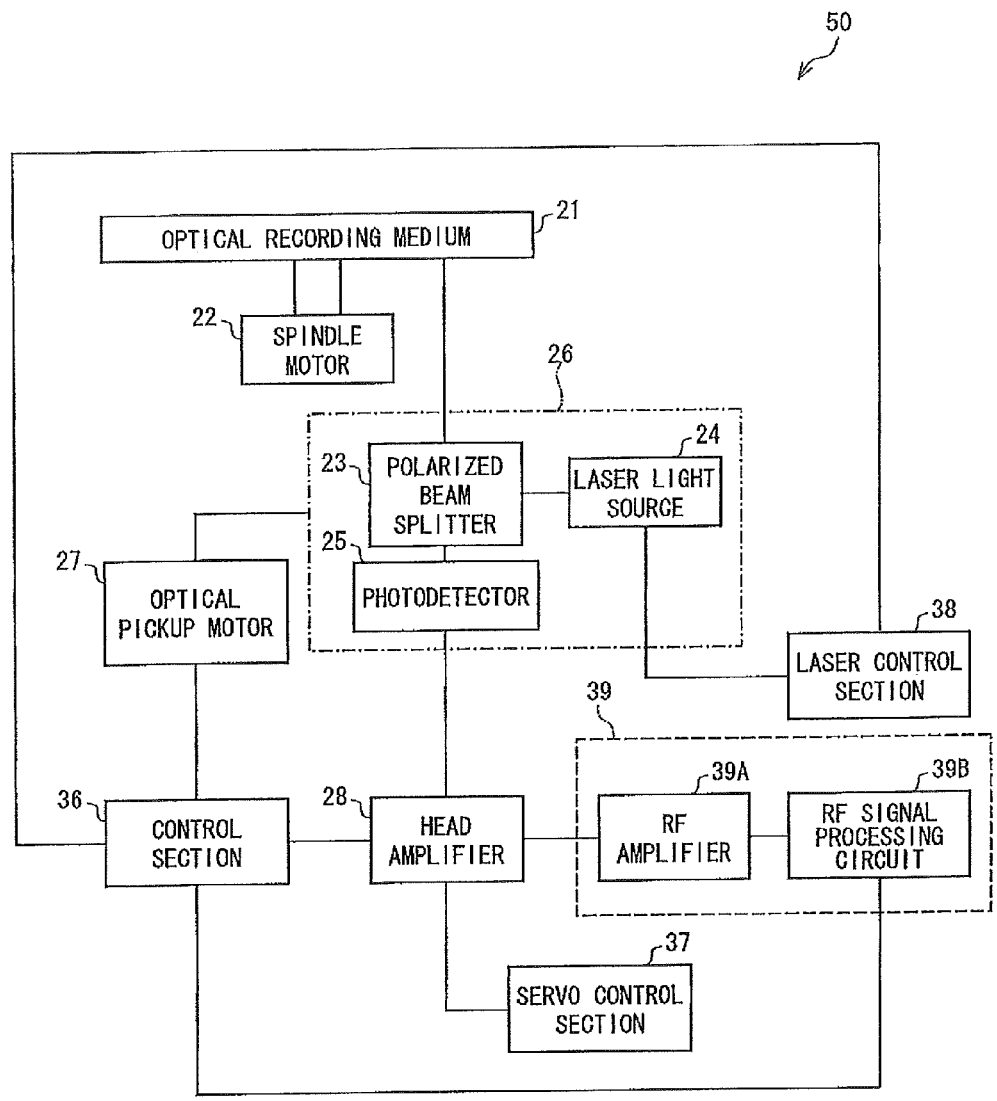
FIG. 9 is a block diagram illustrating an arrangement of an optical recording medium reproduction device of an embodiment of the present invention.

FIG. 9 is a view illustrating an arrangement of the reproduction device 50.

As shown in FIG. 9, the reproduction device 50 includes a spindle motor 22, an optical pickup (reproducing section) 26, an optical pickup motor 27, a head amplifier 28, a control section 36, a servo control section 37, a laser control section 38, and an RF signal processing section 39. Note that a normal medium or the super-resolution medium 10a is loaded, as an optical recording medium 21, into the reproduction device 50.

The spindle motor 22 rotates the optical recording medium 21 in order that information recorded on the optical recording medium 21 is reproduced.

The optical pickup 26 includes a converging lens (not shown), a diffraction grating (not shown), a ¼ wave plate (not shown), a polarized beam splitter 23, a laser light source 24, and a photodetector 25.

The laser light source 24 emits a laser beam in order that the information recorded on the optical recording medium 21 is reproduced. The laser beam emitted from the laser light source 24 has a wavelength of 405 nm as described in the Embodiment 2. The laser light source 24 emits a laser beam having power suitable for a normal medium at an initial stage of reproduction. The diffraction grating causes the laser beam emitted from the laser light source 24 to be separated into a main, beam for signal reproduction and a sub beam for tracking servo (the main beam and the sub beam are hereinafter collectively referred to simply as "laser beam").

The polarized beam splitter 23 allows transmission of the laser beam or reflects the laser beam in accordance with a polarization direction of the laser beam. The polarized beam splitter 23 reflects a laser beam which has passed through the diffraction grating. The ¼ wave plate is capable of converting linear polarization into circular polarization or converting circular polarization into linear polarization. The ¼ wave plate converts the laser beam reflected from the polarized beam splitter 23 into circularly polarized light. The converging lens causes the laser beam which has passed through the ¼ wave plate to be focused on the optical information recording medium 21. The numerical aperture NA of the converging lens is 0.85 as described in the Embodiment 2.

The laser beam reflected from the optical recording medium 21 passes through the converging lens, is converted into linearly polarized light by the ¼ wave plate, passes through the polarized beam splitter 23, and is then applied to the photodetector 25. The photodetector 25 converts the light reflected from the optical recording medium 21 into an electric signal.

The optical pickup motor 27 controls location of the optical pickup 26 under the control of the control section 36 so that the optical pickup 26 accesses a desired position of the optical information recording medium 21.

The head amplifier 28 amplifies the electric signal generated in the photodetector 25.

The control section 36 controls operation of the reproduction device 50. This is described below in detail.

The servo control section 37 carries out various kind of general servo control such as tracking servo control based on the electric signal amplified by the head amplifier 28. For example, the tracking servo control is such that (i) a tracking error signal is generated from the electric signal amplified by the head amplifier 28, and (ii) the converging lens in the optical pickup 26 is repeatedly controlled until a value of a tracking error signal becomes zero.

The laser control section 38 controls power of a laser beam emitted from the laser light source 24, by a general method under the control of the control section 36.

The RF signal processing section 39 includes an RF amplifier 39A and an RF signal processing circuit (content information reproducing section) 39B. The RF amplifier 39A further amplifies the electric signal amplified by the head amplifier 28. Under the control of the control section 36, the RF signal processing circuit 39B carries out equalization process and decoding process with respect to the electric signal amplified by the RF amplifier 39A so as to reproduce content information recorded on the optical recording medium 21. The term "equalization process" refers to an arithmetic process for reducing signal distortion and noise caused by an adjacent prepit, an adjacent space and the like, and the term "decoding process" refers to an arithmetic process for decoding a waveform of a signal that has been subjected to the equalization process so as to convert it into a digital signal represented by "1" or "0". Note that the RF signal processing circuit 39B does not carry out the equalization process and the decoding process at an initial stage of reproduction. Note also that the term "initial stage of reproduction" basically refers to "stage of reproduction of the medium information region".

Figure 10:
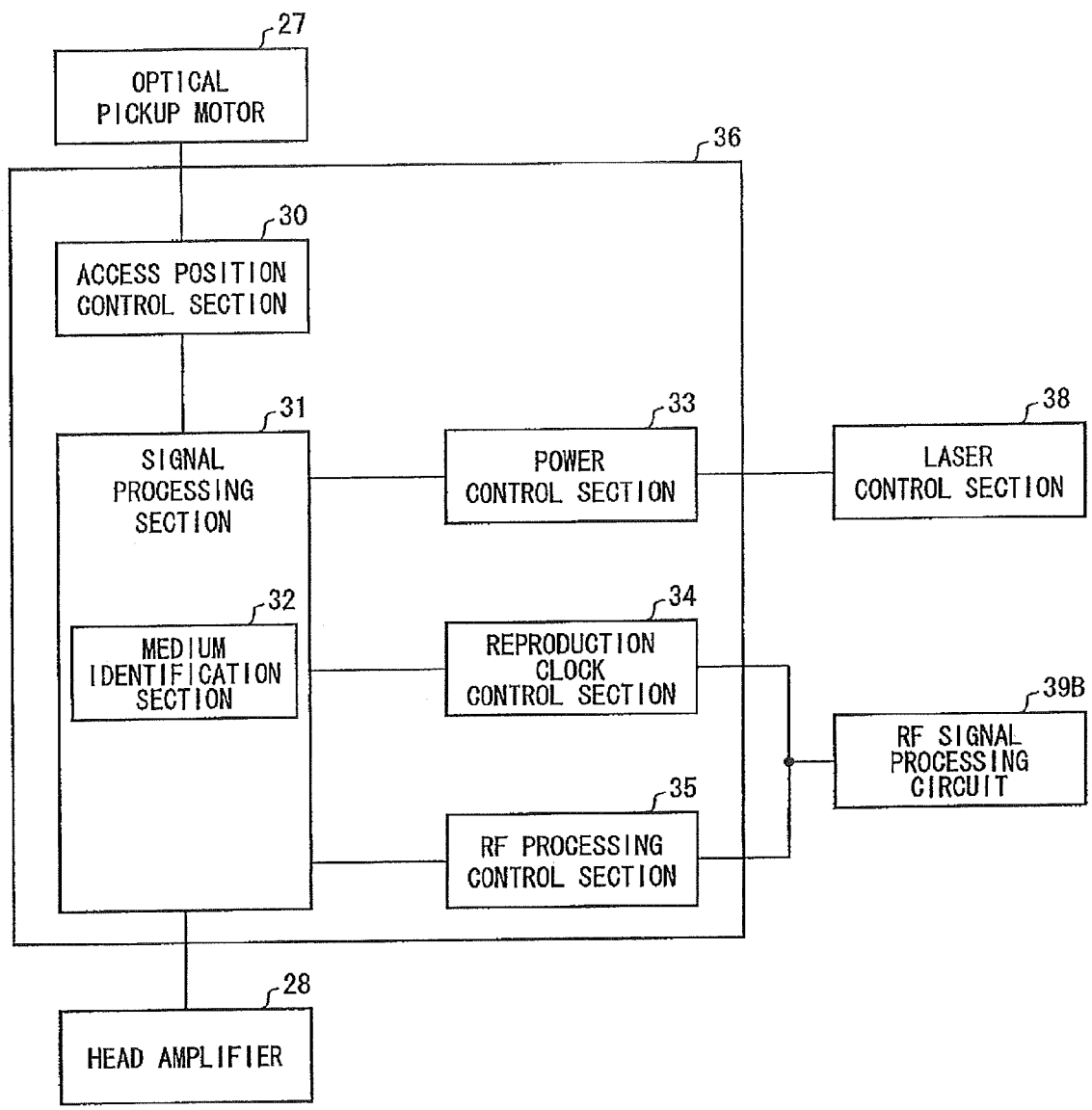
FIG. 10 is a block diagram illustrating an arrangement of a control section of the optical recording medium reproduction device.

FIG. 10 illustrates an arrangement of the control section 36.

As shown in FIG. 10, the control section 36 includes an access position control section 30, a signal processing section (information acquisition section) 31, a medium identification section 32, a power control section 33, a reproduction clock control section 34, and an RF processing control section (blank control section) 35.

The access position control section 30 controls the optical pickup motor 27 so that the optical pickup 26 accesses a desired position of the optical recording medium 21. At the start of reproduction, the access position control section 30 controls the optical pickup motor 27 so that the optical pickup 26 accesses the medium information region of the optical recording medium 21.

The signal processing section 31 carries out equalization process and decoding process with respect to the electric signal supplied from the head amplifier 28 so as to reproduce various kinds of information. The signal processing section 31 supplies the various kinds of information to the medium identification section 32, the power control section 33, the reproduction clock control section 34, and the RF processing control section 35.

The medium identification section 32 is provided in the signal processing section 31, and determines, based on the information (medium identification information) supplied from the signal processing section 31, whether the optical recording medium 21 is a normal medium or the super-resolution medium 10a.

The power control section 33 controls the laser control circuit 38 based on the information supplied from the signal processing section 31 so as to control power of a laser beam emitted from the laser light source 24.

The reproduction clock control section 34 controls, based on the information (reproduction clock switching information) supplied from the signal processing section 31, a reproduction clock used while the content information is being reproduced by the RF signal processing circuit 39B.

The RF processing section 35 controls the equalization process and the decoding process carried out in the RF signal processing circuit 39B, based on a result determined by the medium identification section 32 or the information (address information (blank region information) of the blank region 2a) supplied from the signal processing section 31.

Figure 11:
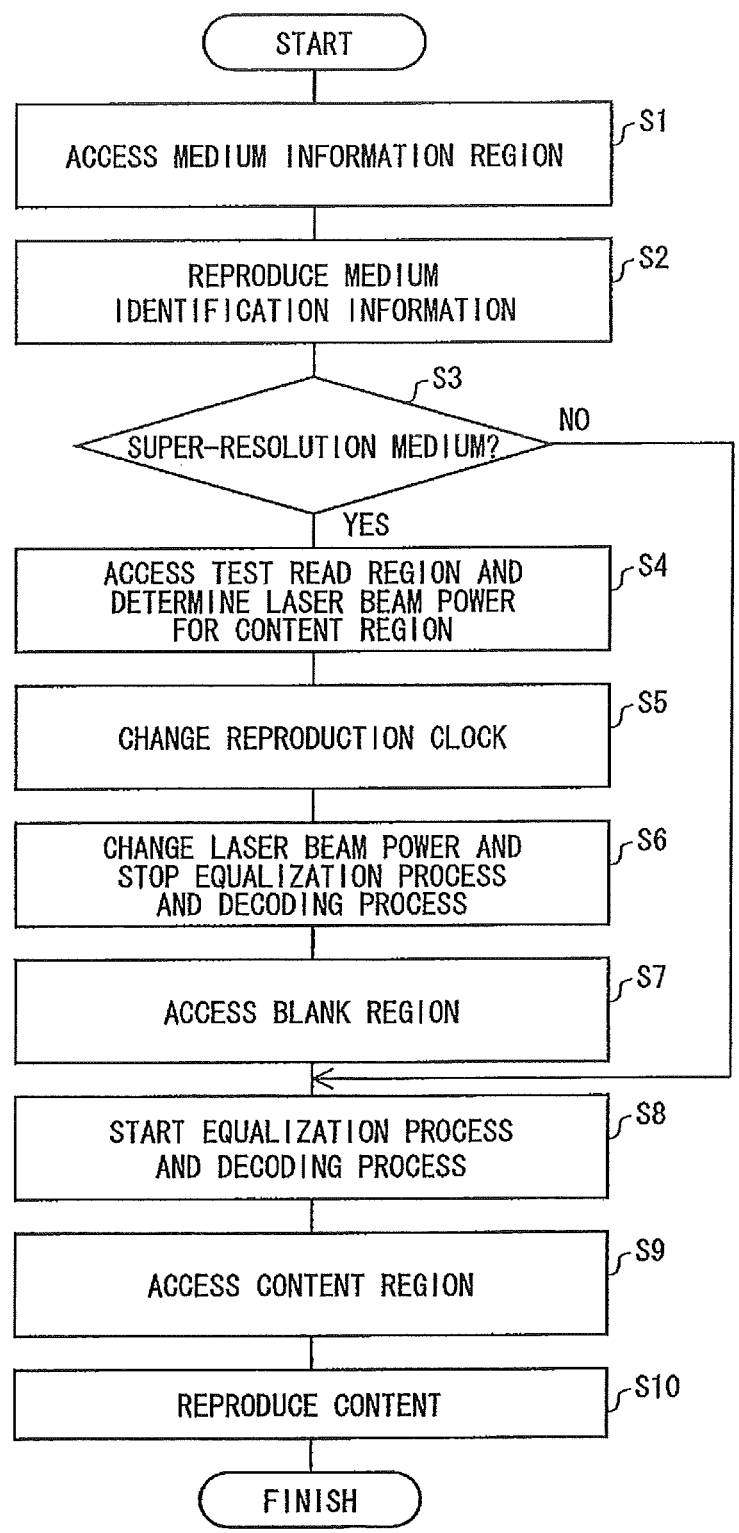
FIG. 11 is a flow chart showing a flow of processing operation of the optical recording medium reproduction device.

The following description deals with processing operation (reproduction operation) of the reproduction device 50 with reference to FIG. 11. FIG. 11 shows a flow of the processing operation of the reproduction device 50.

When the optical recording medium 21 is loaded into the reproduction device 50, the reproduction device 50 detects the optical recording medium 21 and causes the spindle motor 22 to rotate the optical recording medium 21 ("START" in the flow chart of FIG. 11). Next, the access position control section 30 of the control section 36 controls the optical pickup motor 27 so that the optical pickup 26 accesses the medium information region of the optical recording medium 21. Note that, at the start of the reproduction, the optical pickup accesses the medium information region. Subsequently, the medium information region is irradiated with a laser beam emitted from the laser light source 24 (S1 in the flow chart of FIG. 11). The laser beam emitted from the laser light source 24 has power suitable for a normal medium. Note that, at the start of the reproduction, the laser light source 24 emits a laser beam having power suitable for a normal medium.

The light reflected from the medium information region is supplied to the photodetector 25 via the polarized beam splitter 23, and the photodetector 25 converts the light into an electric signal. The electric signal generated in the photodetector 25 is supplied to the signal processing section 31 of the control section 36, the servo control section 37, and the RF processing section 39 via the head amplifier 28. The servo control section 37 carries out various kinds of servo control in response to the electric signal. The RF signal processing circuit 39B carries out no processing since this is the initial stage of the reproduction.

The signal processing section 31 processes the electric signal so as to reproduce the medium identification information (82), and supplies the medium identification information to the medium identification section 32. The medium identification section 32 identifies the optical recording medium 21 based on the medium identification information (83).

In a case where it is determined, by the medium identification section 32, that the optical recording medium 21 is a normal medium ("NO" in S3), the RF processing control section 35 controls the RP signal processing circuit 39B based on the result determined by the medium identification section 32 so that the RF signal processing circuit 39B carries out equalization process and decoding process (S8). Next, the optical pickup 26 is caused access a content region of the normal medium, and the laser light source 24 irradiates the content region with a laser beam having power suitable for a normal medium (89). The laser beam reflected from the content region is supplied to the RF signal processing section 39 via the photodetector 25 and the head amplifier 28, and the RP signal processing section 39 reproduces content information (S10).

Meanwhile, in a case where it is determined, by the medium identification section 32, that the optical recording medium 21 is the super-resolution medium 10a ("YES" in S3), the optical pickup 26 is caused to access the test read region 1B of the medium information region 1a, and the laser light source 24 irradiates the test read region 1B with a laser beam. The laser beam is reflected from the test read region 1B, and is supplied to the power control section 33 via the photodetector 25, the head amplifier 28, and the signal processing section 31. The power control section 33 controls the laser control circuit 38 so as to gradually change power of the laser beam emitted from the laser light source 24. Thus, the power control section 33 determines laser beam power suitable for the blank region 2a and the content region 3a (S4).

More specifically, the power control section 33 reproduces the train of prepits in the test read region 1A which train of prepits has a length equivalent to reference data while changing power of the laser beam emitted from the laser light source 24, and determines laser beam power which causes the smallest number of reproduction errors, as the laser beam power suitable for the blank region 2a and the content region 3a. However, the present embodiment is not limited to this. Alternatively, the power control section 33 may determine, as the laser beam power suitable for the blank region 2a and the content region 3a, laser beam power which makes a tilt margin of the medium maximum or a middle value of values of laser beam power which causes an error at a rate equal to or smaller than a predetermined rate. The power control section 33 stores, in a memory (not shown), the laser beam power suitable for the blank region 2a and the content region 3a.

Subsequently, the reproduction clock switching information recorded on the medium information region 1a is reproduced by the signal processing section 31, and is then supplied to the reproduction clock control section 34. Based on the reproduction clock switching information, the reproduction clock control section 34 controls the reproduction clock used while the content information is being reproduced by the RP signal processing circuit 39B so as to switch the reproduction clock into the one suitable for a super-resolution medium (S5).

Subsequently, the address information of the blank region 2a that is recorded on the medium information region 1a is reproduced by the signal processing section 31, and is then supplied to the power control section 33 and the RF processing control section 35. Based on the address information of the blank region 2a, the power control section 33 changes power of the laser beam emitted from the laser light source 24 into the one determined in 84, i.e., the one suitable for the content region 3a. Further, based on the address information of the blank region 2a, the RF processing control section 35 causes the RF signal processing circuit 39B to maintain its state, i.e., stop the equalization process and the decoding process (S6).

When the optical pickup 26 moves from the medium information region 1a to the blank region 2a, light reflected from the blank region 2a is supplied to the servo control section 37 via the photodetector 25 and the head amplifier 28 so that the various kinds of servo control are continued (87). Since no information is recorded on the blank region 2a, reproduction of the blank region 2a does not affect the control of the control section 36.

Subsequently, the optical pickup 26 moves from the blank region 2a to the content region 3a. In this case, the power control section 33 maintains the power of the laser beam emitted from the laser light source 24 based on the address information of the blank region 2a. Further, the RF processing control section 35 controls the RF signal processing circuit 39B based on the address information of the blank region 2a so that the RF signal processing circuit 39B carries out the equalization process and the decoding process (S8).

When the optical pickup 26 moves from the blank region 2a to the content region 3a, light reflected from the content region 3a is supplied to the RF signal processing section 39 via the photodetector 25 and the head amplifier 28 so that content information is reproduced (S10).

As described above, the reproduction device 50 reproduces the medium identification information with the use of a laser beam having power suitable for a normal medium, and then determines, based on the medium identification information thus reproduced, whether an loaded optical recording medium is a normal medium or the super-resolution medium 10a. Based on a result thus determined, the reproduction device 50 carries out processing suitable for the type of the optical recording medium (emits a laser beam having power suitable for the type of the optical recording medium). In the blank region 2a, the reproduction device 50 continues to carry out the servo control, but stops the equalization process and the decoding process so as to stop the reproduction of the content information. In this manner, the reproduction device 50 is capable of reproducing both of a normal medium and the super-resolution medium 10a.

Further, it is possible to reduce power consumption of the reproduction device 50 since the reproduction device 50 does not carry out the equalization process and the decoding while causing the optical system to travel through the blank region 2a, as described above. Further, it is possible to shorten a time period it takes for the optical system to travel through the blank region 2a in a case where the reproduction device 50 is arranged such that linear speed, which is traveling speed of the optical system in a tangential direction, is controlled by the equalization process and/or the decoding process. This makes it possible to more smoothly shift to reproduction of the content region 3a in a shorter time after the reproduction of the medium information region 1a.

The present embodiment has dealt with a case where the test read region 1A is used in determining laser beam power suitable for reproduction of the content region 3a. However, in a case where a plurality of super-resolution media are the same in laser beam power suitable for reproduction of the content region, information of such laser beam power may be recorded in the reproduction device 50 and the most suitable laser beam power may be determined based on the information. It is also possible that information of laser beam power determined with the use of the test read region is recorded in a memory, and next time the most suitable laser beam power is determined based on the information.

Embodiment 6

Another embodiment of a reproduction device of the present invention is described below with reference to FIG. 12. The present embodiment deals with, as examples, a case where a reproduction device 50a reproduces a normal medium and a case where the reproduction device 50a reproduces the super-resolution medium 10b described in the Embodiment 3. For convenience of description, constituents which have identical functions to those of the Embodiment 5 are given identical reference numerals, and are not explained repeatedly. Basically, the following description deals with differences from the reproduction device 50 of the Embodiment 5.

An arrangement of the reproduction device 50a is similar to that of the reproduction device 50, and therefore is not described here.

Figure 12:
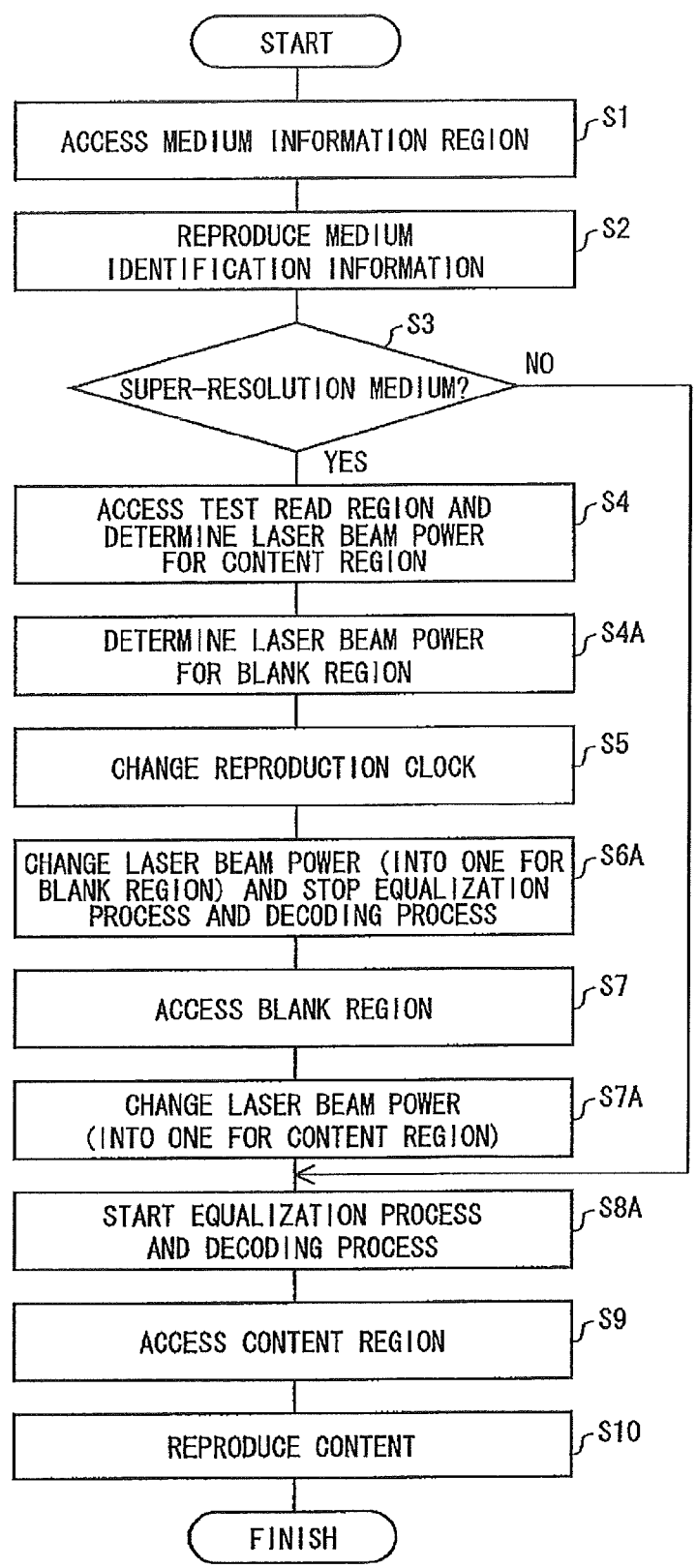
FIG. 12 is a flow chart showing a flow of processing operation of an optical recording medium reproduction device of another embodiment of the present invention.
Figure 13:
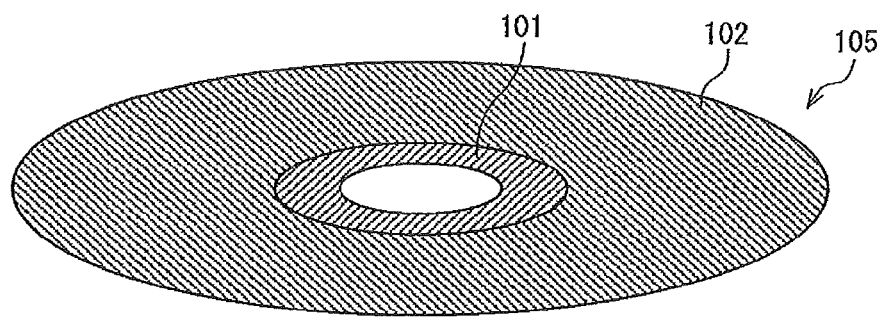
FIG. 13 is a view illustrating an external appearance of a super-resolution optical recording medium.
Figure 14:
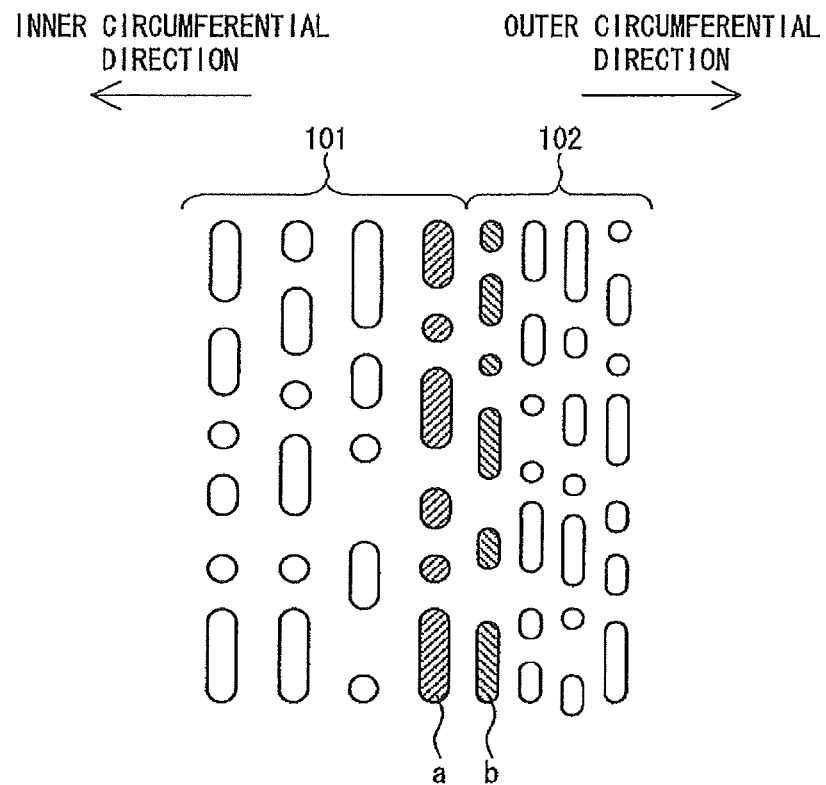
FIG. 14 is an enlarged view of an interface between two regions of the super-resolution optical recording medium shown in FIG. 13, i.e., a region on which medium identification information is recorded and a region on which content information is recorded.

The following description deals with processing operation (reproduction operation) of the reproduction device 50a with reference to FIG. 12. FIG. 12 shows a flow of the processing operation of the reproduction device 50a. The processing operation of the reproduction device 50a is different from that of the reproduction device 50 (see FIG. 11) in that (i) "S4A" is added between "S4" and "S5", (ii) "S6" is replaced by "S6A", and (iii) "S7A" is added between "S7" and "S8".

When an optical recording medium 21 is loaded into the reproduction device 50a, the reproduction device 50a detects the optical recording medium 21 and causes a spindle motor 22 to rotate the optical recording medium 21 ("START" in the flow chart of FIG. 12). Next, an access position control section 30 of a control section 36 controls an optical pickup motor 27 so that an optical pickup 26 accesses a medium information region of the optical recording medium 21. Note that, at the start of the reproduction, the optical pickup accesses the medium information region. Subsequently, the medium information region is irradiated with a laser beam emitted from a laser light source 24 (S1 in the flow chart of FIG. 12). The laser beam emitted from the laser light source 24 has power suitable for a normal medium. Note that, at the start of the reproduction, the laser light source 24 emits a laser beam having power suitable for a normal medium.

The light reflected from the medium information region is supplied to a photodetector 25 via various kinds of lens and a polarized beam splitter 23, and the photodetector 25 converts the light into an electric signal. The electric signal generated in the photodetector 25 is supplied to a signal processing section 31 of the control section 36, a servo control section 37, and an RF processing section 39 via a head amplifier 28. The servo control section 37 carries out various kinds of servo control in response to the electric signal. An RF signal processing circuit 39B carries out no processing since this is the initial stage of the reproduction. The signal processing section 31 processes the electric signal so as to reproduce the medium identification information (S2), and supplies the medium identification information to a medium identification section 32. The medium identification section 32 identifies the optical recording medium 21 based on the medium identification information (S3).

In a case where it is determined, by the medium identification section 32, that the optical recording medium 21 is a normal medium ("NO" in S3), the RF processing control section 35 controls the RP signal processing circuit 39B based on the result determined by the medium identification section 32 so that the RF signal processing circuit 39B carries out equalization process and decoding process (88). Next, the optical pickup 26 is caused access a content region of the normal medium, and the laser light source 24 irradiates the content region with a laser beam having power suitable for a normal medium (S9). The laser beam reflected from the content region is supplied to the RF signal processing section 39 via the photodetector 25 and the head amplifier 28, and the RF signal processing section 39 reproduces content information (810).

Meanwhile, in a case where it is determined, by the medium identification section 32, that the optical recording medium 21 is the super-resolution medium 10b ("YES" in S3), the optical pickup 26 is caused to access the test read region 1B of the medium information region 1b, and the laser light source 24 irradiates the test read region 1B with a laser beam. The laser beam is reflected from the test read region 1B, and is supplied to the power control section 33 via the photodetector 25, the head amplifier 28, and the signal processing section 31. The power control section 33 controls the laser control circuit 38 so as to gradually change power of the laser beam emitted from the laser light source 24. Thus, the power control section 33 determines laser beam power suitable for the content region 3b (S4).

More specifically, the power control section 33 reproduces the train of prepits in the test read region 1B which train of prepits has a length equivalent to reference data while changing power of the laser beam emitted from the laser light source 24, and determines laser beam power which causes the smallest number of reproduction errors, as the laser beam power suitable for the content region 3b. However, the present embodiment is not limited to this. Alternatively, the power control section 33 may determine, as the laser beam power suitable for the content region 3b, laser beam power which makes a tilt margin of the medium maximum or a middle value of values of laser beam power which causes an error at a rate equal to or smaller than a predetermined rate. The power control section 33 stores, in a memory (not shown), the laser beam power suitable for the content region 3b.

Subsequently, the blank power information recorded on the medium information region 1b is reproduced by the signal processing section 31 so that laser beam power suitable for the blank region 2b is determined. The power control section 33 stores, in the memory (not shown), the laser beam power suitable for the blank region 2b (S4A). Subsequently, the reproduction clock switching information recorded on the medium information region 1b is reproduced by the signal processing section 31, and is then supplied to the reproduction clock control section 34. Based on the reproduction clock switching information, the reproduction clock control section 34 controls the reproduction clock used while the content information is being reproduced by the RF signal processing circuit 39B so as to switch the reproduction clock into the one suitable for a super-resolution medium (S5).

Subsequently, the address information of the blank region 2b that is recorded on the medium information region 1b is reproduced by the signal processing section 31, and is then supplied to the power control section 33 and the RF processing control section 35. Based on the address information of the blank region 2b, the power control section 33 changes power of the laser beam emitted from the laser light source 24 into the one determined in S4A, i.e., the one suitable for the blank region 2b. Further, based on the address information of the blank region 2b, the RF processing control section 35 causes the RF signal processing circuit 39B to maintain its state, i.e., stop the equalization process and the decoding process (S6A).

When the optical pickup 26 moves from the medium information region 1b to the blank region 2b, light reflected from the blank region 2b is supplied to the servo control section 37 via the photodetector 25 and the head amplifier 28 so that the various kinds of servo control are continued (87). Since no information is recorded on the blank region 2b, reproduction of the blank region 2b does not affect the control of the control section 36.

Next, the optical pickup 26 moves from the blank region 2b to the content region 3b. In this case, based on the address information of the blank region 2b, the power control section 33 changes power of the laser beam emitted from the laser light source 24 into the one determined in S4, i.e., the one suitable for the content region 3b (S7A). Further, the RF processing control section 35 controls the RF signal processing circuit 39B based on the address information of the blank region 2b so that the RF signal processing circuit 39B carries out the equalization process and the decoding process (S8).

When the optical pickup 26 moves from the blank region 2b to the content region 3b, light reflected from the content region 3b is supplied to the RF signal processing section 39 via the photodetector 25 and the head amplifier 28 so that content information is reproduced (S10).

As described above, the reproduction device 50a reproduces the medium identification information with the use of a laser beam having power suitable for a normal medium, and then determines, based on the medium identification information thus reproduced, whether an loaded optical recording medium is a normal medium or the super-resolution medium 10b. Based on a result thus determined, the reproduction device 50a carries out processing suitable for the type of the optical recording medium (emits a laser beam having power suitable for the type of the optical recording medium). In the blank region 2b, the reproduction device 50a continues to carry out the servo control, but stops the equalization process and the decoding process so as to stop the reproduction of the content information. In this manner, the reproduction device 50a is capable of reproducing both of a normal medium and the super-resolution medium 10b.

Further, it is possible to reduce power consumption of the reproduction device 50a since the reproduction device 50a does not carry out the equalization process and the decoding while causing the optical system to travel through the blank region 2b, as described above. Further, it is possible to shorten a time period it takes for the optical system to travel through the blank region 2b in a case where the reproduction device 50a is arranged such that linear speed, which is traveling speed of the optical system in a tangential direction, is controlled by the equalization process and/or the decoding process. This makes it possible to more smoothly shift to reproduction of the content region 3b in a shorter time after the reproduction of the medium information region 1b.

The present embodiment has dealt with a case where the test read region 1B is used in determining laser beam power suitable for reproduction of the content region 3b. However, in a case where a plurality of super-resolution media are the same in laser beam power suitable for reproduction of the content region, information of such laser beam power may be recorded in the reproduction device 50a and the most suitable laser beam power may be determined based on the information. It is also possible that information of laser beam power determined with the use of the test read region is recorded in a memory, and next time the most suitable laser beam power is determined based on the information.

The Embodiments 5 and 6 dealt with how the super-resolution medium 10a and the super-resolution medium 10b are reproduced, respectively. The following description deals with how the super-resolution medium 10 described in the Embodiment 1 is reproduced. The super-resolution medium 10 is reproduced as follows, for example.

After completion of reproduction of the medium information region 1, the blank region 2 is reproduced without changing laser beam power (since the address information of the blank region 2 is not recorded). In this case, a spot diameter does not go into a pseudo-reduction state since the laser beam power is not changed. Therefore, the tracking servo control is not carried out properly as a track pitch becomes narrower. The servo control section 37 detects such improper tracking servo control, and then supplies the information (blank region information) to the signal processing section 31. Based on the information, the laser beam power is changed into the one suitable for the content region 3, and reproduction is continued (reproduction shifts from the blank region 2 to the content region 3). Note that the servo control section 37 can detect such improper tracking servo control by detecting a state where stable control (i.e., a state where a value of a tracking error signal becomes zero) is not achieved due to disturbances such as noise from an adjacent track (e.g., a state where a value of a tracking error signal is not zero continues for over a certain period of time).

Further, the super-resolution medium 20 of the Embodiment 4 which is operated in conformity with the HD_DVD standard can be reproduced by a similar method to the super-resolution mediums 10a and 10b respectively described in the Embodiments 5 and 6 in a case where the converging lens is changed into the one having numerical aperture of 0.65.

The arrangements of the reproduction devices 50 and 50a respectively described in the Embodiments 5 and 6 are examples, and can be varied appropriately. For example, each of the reproduction devices 50 and 50a is arranged such that the information of the medium information region is reproduced in the signal processing section 31. However, another arrangement is possible in which the information of the medium information region is reproduced in the RF signal processing circuit 39B, and is then supplied to the signal processing section 31. Further, a tracking error signal may be generated in the signal processing section 31, and a function of the servo control section 37 may be substituted by the control section 36.

Finally, each of the sections of the control section 36 in each of the reproduction devices 50 and 50a may be realized by way of hardware or software as executed by a CPU as follows.

The reproduction devices 50 and 50a each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also, be achieved by mounting to the reproduction devices 50 and 50a a computer-readable storage medium containing control program code (executable program, intermediate code program, or source program) for the control section 36 of the reproduction devices 50 and 50a, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The reproduction devices 50 and 50a may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a computer data signal embedded in a carrier wave in which the program code is embodied electronically.

Further, each of the reproduction devices may be stationary or portable.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An optical recording medium of the present invention is applicable to a medium such as BD-ROM (Blu-ray Disc Read Only Memory), BD-R (Blu-ray Disc Recordable), BD-RE (Blu-ray Disc Rewritable), HD_DVD, CD-ROM (Compact Disc Read Only Memory), CD-R (Compact Disc Recordable), CD-RW (Compact Disc Rewritable), DVD-ROM (Digital Versatile Disc Read Only Memory), DVD-R (Digital Versatile Disc Recordable), or DVD-RW (Digital Versatile Disc Rewritable).

The invention claimed is:
1. A super-resolution optical recording medium comprising:
    a first region on which medium identification information which causes a medium type to be identified is recorded with use of trains of prepits each of which is constituted by prepits longer than a resolution limit of an optical system of an optical recording medium reproduction device;

a second region on which content information is recorded with use of trains of prepits each of which includes a prepit equal to or shorter than the resolution limit of the optical system, the second region having a track pitch smaller than that of the first region; and a blank region provided between the first region and the second region so as to spirally connect the trains of prepits in the first region and the trains of prepits in the second region, the blank region including at least two tracks, a track pitch, between (i) a first one of said at least two tracks that is adjacent to a first one of the trains of prepits of the first region and (ii) the first one of the trains of prepits, being identical to a track pitch of the first region, a track pitch, between (i) a second one of said at least two tracks that is adjacent to a second one of the trains of prepits of the second region and (ii) the first one of the trains of prepits which is on the first region side, changing into a track pitch of the second region, and a track pitch, between (i) the second one of said at least two tracks and (ii) the second one of the trains of prepits being identical to the track pitch of the second region, no information being recorded on the blank region, and reproduction clock information being recorded on the first region.

2. A method for reproducing the super-resolution optical recording medium as set forth in claim 1, the method comprising the steps of:

acquiring the medium identification information recorded on the first region;

controlling a reproduction clock of the second region on a basis of the reproduction clock information; and reproducing the content information recorded on the second region.

3. A super-resolution optical recording medium comprising:

a first region on which medium identification information which causes a medium type to be identified is recorded with use of guide grooves each of which has wobbles having a cycle longer than a resolution limit of an optical system of an optical recording medium reproduction device;

a second region on which content information is to be recorded with use of trains of marks each of which includes a mark or a space equal to or shorter than the resolution limit of the optical system, the second region having guide grooves having a track pitch smaller than that of the first region, and the second region being provided outside an outer periphery of the first region; and a blank region provided between the first region and the second region, the blank region having a first guide groove closest to the first region and a second guide groove closest to the second region, a track pitch between the first guide groove and an adjacent guide groove in a region outside the blank region being identical to the track pitch of the first region, a track pitch between the second guide groove and an adjacent guide groove in a region outside the blank region being identical to the track pitch of the second region, the blank region including at least two tracks having a track pitch which changes from the track pitch of the first region to the track pitch of the second region, no information being recorded on the blank region, and reproduction clock information being recorded on the first region.

4. A method for reproducing the super-resolution optical recording medium as set forth in claim 3, the method comprising the steps of:

acquiring the medium identification information recorded on the first region;

controlling a reproduction clock of the second region on a basis of the reproduction clock information; and reproducing the content information recorded on the second region.

* * * * *